(12) United States Patent
Kawauchi et al.

(10) Patent No.: US 11,260,808 B2
(45) Date of Patent: Mar. 1, 2022

(54) ON-BOARD COMMUNICATION DEVICE, ON-BOARD COMMUNICATION SYSTEM, COMMUNICATION CONTROL METHOD, AND COMMUNICATION CONTROL PROGRAM

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Takehiro Kawauchi, Osaka (JP); Akihito Iwata, Osaka (JP); Hirofumi Urayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems Ltd., Yokkaichi (JP)

( * ) Notice: Subject to any disclaimer, the term of this patent is extended or adjusted under 35 U.S.C. 154(b) by 195 days.

(21) Appl. No.: 16/615,442

(22) PCT Filed: Jan. 24, 2018

(86) PCT No.: PCT/JP2018/002056
§ 371 (c)(1),
(2) Date: Nov. 21, 2019

(87) PCT Pub. No.: WO2018/216262
PCT Pub. Date: Nov. 29, 2018

(65) Prior Publication Data
US 2020/0172028 A1     Jun. 4, 2020

(30) Foreign Application Priority Data

May 22, 2017  (JP) .............................. JP2017-100844

(51) Int. Cl.
*B60W 50/00*     (2006.01)
*B60R 16/023*    (2006.01)

(52) U.S. Cl.
CPC ........ *B60R 16/0232* (2013.01); *B60W 50/00* (2013.01); *B60W 2050/0055* (2013.01); *B60W 2050/0056* (2013.01)

(58) Field of Classification Search
USPC .......................................................... 701/1
See application file for complete search history.

(56) References Cited

U.S. PATENT DOCUMENTS 9,173,100 B2 * 10/2015 Ricci .................... G06F 11/0748
10,235,523 B1 * 3/2019 Keller, III ........... G06F 13/4282
(Continued)

FOREIGN PATENT DOCUMENTS

EP         0858195 B1 *  6/2006  ......... H04L 25/0274
JP         H04-056437 A  2/1992
(Continued)

*Primary Examiner* — Jonathan L Sample
(74) *Attorney, Agent, or Firm* — Baker Botts L.L.P.; Michael A. Sartori

(57) ABSTRACT

This on-vehicle communication apparatus is configured to communicate with another on-vehicle communication apparatus by using one differential signal line, and includes: a high-band communication unit configured to generate a high-band signal including communication information and output the high-band signal to the differential signal line; and a low-band communication unit configured to generate a direct-current signal or a low-band signal and to output the direct-current signal or the low-band signal to the differential signal line.

20 Claims, 25 Drawing Sheets

(56) References Cited

U.S. PATENT DOCUMENTS

| | | | |
|---|---|---|---|
| 2005/0060069 A1* | 3/2005 | Breed | G08G 1/164 701/408 |
| 2008/0218239 A1* | 9/2008 | Sobue | H04L 25/0282 327/331 |
| 2012/0249257 A1* | 10/2012 | Takahashi | H03H 1/02 333/12 |
| 2013/0029595 A1* | 1/2013 | Widmer | H04B 5/0031 455/39 |
| 2014/0056388 A1* | 2/2014 | Mori | H04B 1/10 375/340 |
| 2015/0065039 A1* | 3/2015 | Nii | H01F 38/14 455/41.1 |
| 2015/0105973 A1* | 4/2015 | Cicala | G07C 5/008 701/34.4 |
| 2016/0173530 A1* | 6/2016 | Miyake | H04L 67/12 726/3 |
| 2018/0041358 A1* | 2/2018 | Kishigami | H04B 1/40 |

FOREIGN PATENT DOCUMENTS

| | | | | |
|---|---|---|---|---|
| JP | 2004-336482 A | 11/2004 | | |
| JP | 2008-227696 A | 9/2008 | | |
| JP | 2011-151591 A | 8/2011 | | |
| JP | 2013-168865 A | 8/2013 | | |
| WO | WO-2017183508 A1 * | 10/2017 | | H04L 7/0091 |

* cited by examiner

FIG. 10

| LEVEL RANGE OF DIRECT-CURRENT SIGNAL | CONTENT OF MANAGEMENT INFORMATION |
|---|---|
| 8.5V ~ 9.0V | SQI = 16 |
| 8.0V ~ 8.5V | SQI = 15 |
| ⋮ | ⋮ |
| 1.5V ~ 2.0V | SQI = 2 |
| 1.0V ~ 1.5V | SQI = 1 |

Tab1

FIG. 14

| AMPLITUDE RANGE OF LOW-BAND SIGNAL | CONTENT OF MANAGEMENT INFORMATION |
|---|---|
| 8.5V ~ 9.0V | SQI = 16 |
| 8.0V ~ 8.5V | SQI = 15 |
| ⋮ | ⋮ |
| 1.5V ~ 2.0V | SQI = 2 |
| 1.0V ~ 1.5V | SQI = 1 |

Tab2

FIG. 18

| LEVEL RANGE OF DIRECT-CURRENT SIGNAL | CONTENT OF MANAGEMENT INFORMATION |
|---|---|
| 10.0V ~ 11.0V | FAILURE CONFIRMATION RESPONSE |
| 9.0V ~ 10.0V | FAILURE CONFIRMATION REQUEST |

Tab3

FIG. 23

| LEVEL RANGE OF DIRECT-CURRENT SIGNAL | CONTENT OF MANAGEMENT INFORMATION |
|---|---|
| 10.0V ~ 11.0V | FAILURE CONFIRMATION RESPONSE |
| 9.0V ~ 10.0V | FAILURE CONFIRMATION REQUEST |
| 8.5V ~ 9.0V | SQI = 16 |
| 8.0V ~ 8.5V | SQI = 15 |
| ⋮ | ⋮ |
| 1.5V ~ 2.0V | SQI = 2 |
| 1.0V ~ 1.5V | SQI = 1 |

Tab4

FIG. 24

| LEVEL RANGE OF DIRECT-CURRENT SIGNAL | DETERMINATION CONTENT |
|---|---|
| 0.1V ~ 1.0V | BREAKAGE |

Tab5

ON-BOARD COMMUNICATION DEVICE, ON-BOARD COMMUNICATION SYSTEM, COMMUNICATION CONTROL METHOD, AND COMMUNICATION CONTROL PROGRAM

TECHNICAL FIELD

The present invention relates to an on-vehicle communication apparatus, an on-vehicle communication system, a communication control method, and a communication control program.

This application claims priority on Japanese Patent Application No. 2017-100844 filed on May 22, 2017, the entire content of which is incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) An on-vehicle communication apparatus of the present disclosure is configured to communicate with another on-vehicle communication apparatus by using one differential signal line. The on-vehicle communication apparatus includes: a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line.

(2) An on-vehicle communication apparatus of the present disclosure is configured to communicate with another on-vehicle communication apparatus by using one differential signal line. The on-vehicle communication apparatus includes: a separation unit capable of separating a high-band signal including communication information, and a direct-current signal or a low-band signal, from a signal received via the differential signal line; a high-band communication unit configured to acquire the communication information from the high-band signal separated by the separation unit; and a low-band communication unit configured to acquire information from the direct-current signal or the low-band signal separated by the separation unit.

(15) An on-vehicle communication system of the present disclosure includes: a first on-vehicle communication apparatus and a second on-vehicle communication apparatus which are configured to communicate with each other by using one differential signal line. The first on-vehicle communication apparatus includes a high-band communication unit configured to generate a high-band signal including communication information and to output the high-band signal to the differential signal line, and a low-band communication unit configured to generate a direct-current signal or a low-band signal and to output the direct-current signal or the low-band signal to the differential signal line. The second on-vehicle communication apparatus includes a separation unit capable of separating a high-band signal, and a direct-current signal or a low-band signal, from a signal received via the differential signal line, a high-band communication unit configured to acquire information from the high-band signal separated by the separation unit, and a low-band communication unit configured to acquire information from the direct-current signal or the low-band signal separated by the separation unit.

(20) A communication control method of the present disclosure is to be performed in an on-vehicle communication apparatus configured to communicate with another on-vehicle communication apparatus by using one differential signal line. The communication control method includes the steps of: generating a high-band signal including communication information and outputting the high-band signal to the differential signal line; and generating a direct-current signal or a low-band signal and outputting the direct-current signal or the low-band signal to the differential signal line.

(21) A communication control method of the present disclosure is to be performed in an on-vehicle communication apparatus configured to communicate with another on-vehicle communication apparatus by using one differential signal line. The communication control method includes the steps of: separating a high-band signal including communication information, and a direct-current signal or a low-band signal, from a signal received via the differential signal line; acquiring the communication information from the separated high-band signal; and acquiring information from the separated direct-current signal or the separated low-band signal.

(22) A communication control program of the present disclosure is to be used in an on-vehicle communication apparatus configured to communicate with another on-vehicle communication apparatus by using one differential signal line. The on-vehicle communication apparatus includes: a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line. The communication control program is configured to cause a computer to function as: a first transmission processing unit configured to transmit information via the high-band communication unit; and a second transmission processing unit configured to transmit information via the low-band communication unit.

(23) A communication control program of the present disclosure is to be used in an on-vehicle communication apparatus configured to communicate with another on-vehicle communication apparatus by using one differential signal line. The on-vehicle communication apparatus includes: a separation unit capable of separating a high-band signal including communication information, and a direct-current signal or a low-band signal, from a signal received via the differential signal line; a high-band communication unit configured to acquire the communication information from the high-band signal separated by the separation unit; and a low-band communication unit configured to acquire information from the direct-current signal or the low-band signal separated by the separation unit. The communication control program is configured to cause a computer to function as: a first reception processing unit configured to receive information via the high-band communication unit; and a second reception processing unit configured to receive information via the low-band communication unit.

One mode of the present disclosure can be realized not only as an on-vehicle communication apparatus including such a characteristic processing unit but also as a semiconductor integrated circuit that realizes a part or the entirety of the on-vehicle communication apparatus.

One mode of the present disclosure can be realized not only as an on-vehicle communication system including such a characteristic processing unit, but also as a method having steps of such characteristic processes. One mode of the present disclosure can be realized as a semiconductor integrated circuit that realizes a part or the entirety of the on-vehicle communication system.

BRIEF DESCRIPTION OF DRAWINGS

FIG. 10 shows one example of a correspondence table held by an on-vehicle communication device and a switch device according to the first embodiment of the present invention.

FIG. 14 shows one example of a correspondence table held by an on-vehicle communication device and a switch device according to the first embodiment of the present invention.

FIG. 18 shows one example of a correspondence table held by an on-vehicle communication device and a switch device according to the second embodiment of the present invention.

FIG. 23 shows one example of a correspondence table held by an on-vehicle communication device and a switch device according to the third embodiment of the present invention.

FIG. 24 shows one example of a breakage determination table held by an on-vehicle communication device and a switch device according to the third embodiment of the present invention.

DESCRIPTION OF EMBODIMENTS

Figure 1:
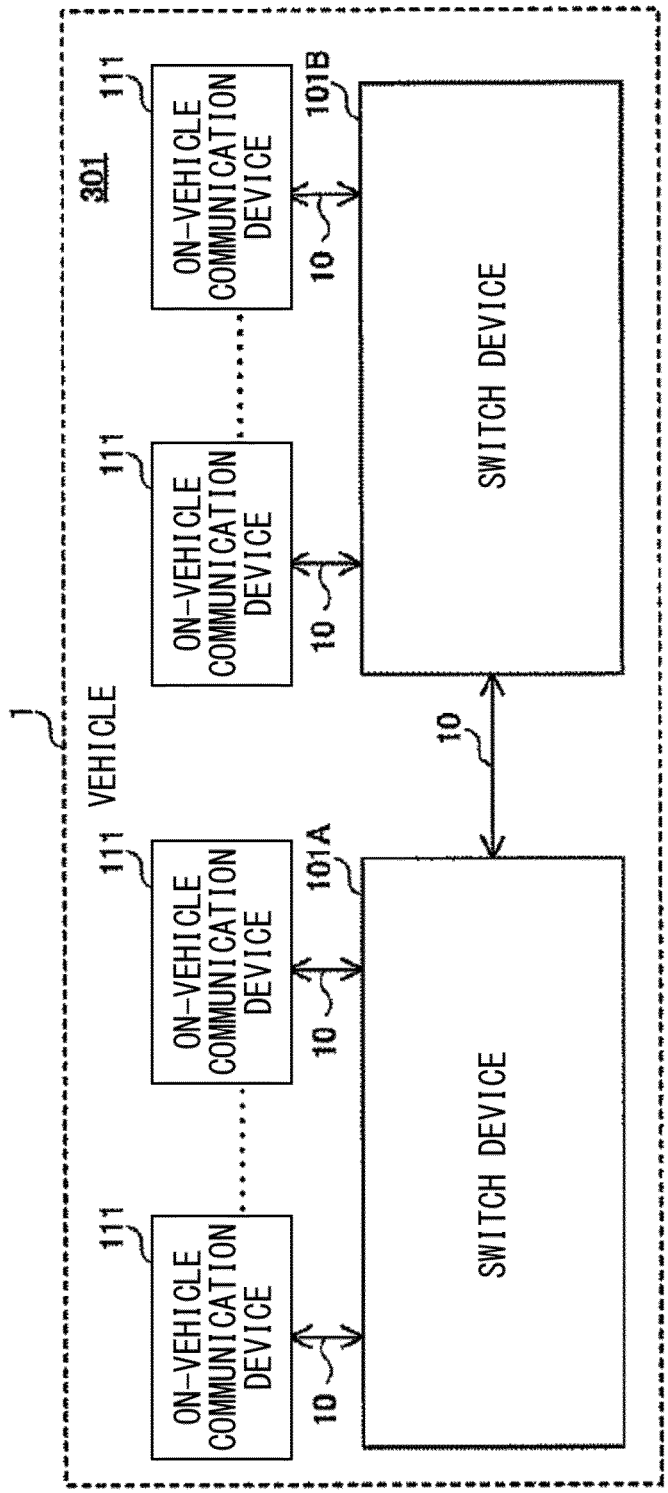
FIG. 1 shows a configuration of an on-vehicle communication system according to a first embodiment of the present invention.

To date, an on-vehicle network system for improving security on an on-vehicle network has been developed.

Problem to be Solved by the Present Disclosure

In the on-vehicle network described in PATENT LITERATURE 1, data is transmitted and received between on-vehicle ECUs (Electronic Control Unit) and between an on-vehicle ECU and a communication gateway.

As a method for efficiently transmitting such data, it is conceivable to provide a plurality of signal lines between apparatuses. However, when a plurality of signal lines are provided, the weight of the vehicle is increased. In addition, when taking space in the vehicle into consideration, a smaller number of signal lines facilitates wiring.

The present disclosure is to solve the above problem. An object of the present disclosure is to provide an on-vehicle communication apparatus, an on-vehicle communication system, a communication control method, and a communication control program that allow efficient transmission of information with a simple configuration in an on-vehicle network.

Effect of the Present Disclosure

According to the present disclosure, information can be efficiently transmitted with a simple configuration in an on-vehicle network.

Description of Embodiment of the Present Disclosure

First, the contents of embodiments of the present disclosure are listed and described.

(1) An on-vehicle communication apparatus according to an embodiment of the present disclosure is configured to communicate with another on-vehicle communication apparatus by using one differential signal line. The on-vehicle communication apparatus includes: a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be outputted to one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

(2) An on-vehicle communication apparatus according to an embodiment of the present disclosure is configured to communicate with another on-vehicle communication apparatus by using one differential signal line. The on-vehicle communication apparatus includes: a separation unit capable of separating a high-band signal, and a direct-current signal or a low-band signal, from a signal received via the differential signal line; a high-band communication unit configured to acquire information from the high-band signal separated by the separation unit; and a low-band communication unit configured to acquire information from the direct-current signal or the low-band signal separated by the separation unit.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be separately received and outputted via one differential signal line, the band in which information can be transmitted by using one differential signal line can be expanded. Accordingly, the amount of information that can be transmitted per unit time in one differential signal line can be increased. Therefore, in the on-vehicle network, information can be efficiently transmitted with a simple configuration.

(3) Preferably, the direct-current signal or the low-band signal includes management information indicating a state regarding a physical layer between the on-vehicle communication apparatus and the other on-vehicle communication apparatus, and the communication information is information that does not include the management information.

Thus, due to the configuration in which the management information is transmitted while being included in the direct-current signal or the low-band signal, the band of the high-band signal for transmitting the communication information can be prevented from being compressed by the management information. Thus, it is possible to prevent occurrence of delay and dropping of the communication information due to transmission of the management information being included in the high-band signal. Accordingly, transmission of the communication information in the on-vehicle network can be efficiently performed.

(4) Preferably, the differential signal line includes two signal lines, and the direct-current signal is transmitted via one of the two signal lines.

Due to this configuration, between on-vehicle communication apparatuses, transmission of information using a direct-current signal or a low-band signal can be performed bidirectionally and simultaneously. Thus, the amount of information that can be transmitted per unit time by using the direct-current signal or the low-band signal can be increased.

(5) More preferably, the management information includes a communication quality between the on-vehicle communication apparatus and the other on-vehicle communication apparatus.

Due to this configuration, for example, the on-vehicle communication apparatus as the transmission source of communication information can recognize the reception quality of the communication information in the on-vehicle communication apparatus as the transmission destination on the basis of the management information from the on-vehicle communication apparatus as the transmission destination, and thus can perform processing in accordance with the recognized reception quality. Accordingly, communication between on-vehicle communication apparatuses can be stabilized.

(6) More preferably, the direct-current signal having a level corresponding to the communication quality or the low-band signal having an amplitude corresponding to the communication quality is transmitted via the differential signal line.

Due to this configuration, transmission via one differential signal line of the management information including the communication quality can be performed in a simple manner.

(7) More preferably, the management information includes failure diagnosis information.

Due to this configuration, the failure diagnosis information can be transmitted by using the direct-current signal or the low-band signal. Thus, a failure in another on-vehicle communication apparatus can be diagnosed without compressing the band of the high-band signal.

(8) More preferably, the on-vehicle communication apparatus further includes an abnormality detection unit configured to detect an abnormality when a level of the direct-current signal acquired by the low-band communication unit is in a predetermined range or when an amplitude of the low-band signal acquired by the low-band communication unit is in a predetermined range.

For example, in a case where the differential signal line has a characteristic that the impedance increases when the differential signal line is degraded, if a configuration is employed in which an abnormality is detected when the level of the direct-current signal or the amplitude of the low-band signal decreases to be in a predetermined range, an abnormality in the differential signal line can be detected in a simple manner, as described above.

(9) More preferably, the direct-current signal or the low-band signal includes management information indicating a state regarding a physical layer between the on-vehicle communication apparatus and the other on-vehicle communication apparatus, the communication information is information that does not include the management information, and the predetermined range does not overlap a range corresponding to the management information.

When the differential signal line is degraded, there is a high possibility that the level of the direct-current signal or the amplitude of the low-band signal is not included in the range corresponding to the management information. As described above, due to the configuration in which the predetermined range does not overlap the range corresponding to the management information, the predetermined range can be set in a range that enables more reliable determination of an abnormality.

(10) More preferably, the on-vehicle communication apparatus further includes a change processing unit configured to perform a process regarding changing of a communication path between the on-vehicle communication apparatus and the other on-vehicle communication apparatus when the abnormality detection unit has detected an abnormality.

Due to this configuration, a redundant configuration of the communication path between the on-vehicle communication apparatus and another on-vehicle communication apparatus can be realized. Thus, the communication information can be more reliably transmitted.

(11) More preferably, the direct-current signal or the low-band signal includes management information indicating a state regarding a physical layer between the on-vehicle communication apparatus and the other on-vehicle communication apparatus, the communication information is information that does not include the management information, the management information includes a communication quality between the on-vehicle communication apparatus and the other on-vehicle communication apparatus, and the on-vehicle communication apparatus further comprises an adjustment unit configured to adjust operation of an amplifier included in the high-band communication unit in accordance with the communication quality acquired by the low-band communication unit.

Due to this configuration, for example, the on-vehicle communication apparatus as the transmission source of communication information can recognize the reception quality of the communication information in the on-vehicle communication apparatus as the transmission destination on the basis of the management information from the on-vehicle communication apparatus as the transmission destination. Thus, the amplification factor of the high-band signal including the communication information can be appropriately adjusted in accordance with the recognized reception quality. Accordingly, communication between on-vehicle communication apparatuses can be stabilized and power consumption can be appropriately managed.

(12) Preferably, a carrier frequency of the high-band signal is 10 mega-hertz or higher.

Due to this configuration, separation from the direct-current signal and the low-band signal can be performed in a preferable manner. Thus, in the on-vehicle network, communication information can be transmitted at a high speed by using the high-band signal while communication in the on-vehicle network is stabilized.

(13) Preferably, a carrier frequency of the low-band signal is less than 1 mega-hertz.

Due to this configuration, separation from the high-band signal can be performed in a preferable manner. Thus, communication in the on-vehicle network can be stabilized.

(14) Preferably, the communication information is an Ethernet frame according to IEEE 802.3.

Due to this configuration, information can be efficiently transmitted with a simple configuration, in the on-vehicle network in which an Ethernet frame according to IEEE 802.3 is transmitted.

(15) An on-vehicle communication system according to an embodiment of the present disclosure includes: a first on-vehicle communication apparatus and a second on-vehicle communication apparatus which are configured to communicate with each other by using one differential signal line. The first on-vehicle communication apparatus includes: a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line. The second on-vehicle communication apparatus includes: a separation unit capable of separating a high-band signal, and a direct-current signal or a low-band signal, from a signal received via the differential signal line; a high-band communication unit configured to acquire information from the high-band signal separated by the separation unit; and a low-band communication unit configured to acquire information from the direct-current signal or the low-band signal separated by the separation unit.

Thus, due to the configuration in which the first on-vehicle communication apparatus and the second on-vehicle communication apparatus are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be transmitted by using one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

(16) Preferably, the high-band communication unit of the second on-vehicle communication apparatus generates a high-band signal including communication information and outputs the high-band signal to the differential signal line; the low-band communication unit of the second on-vehicle communication apparatus generates a direct-current signal or a low-band signal and outputs the direct-current signal or the low-band signal to the differential signal line; the first on-vehicle communication apparatus further includes a separation unit capable of separating a high-band signal, and a direct-current signal or a low-band signal, from a signal received via the differential signal line; the high-band communication unit of the first on-vehicle communication apparatus acquires information from the high-band signal separated by the separation unit; the low-band communication unit of the first on-vehicle communication apparatus acquires information from the direct-current signal or the low-band signal separated by the separation unit; the differential signal line includes two signal lines; the low-band communication unit of the first on-vehicle communication apparatus outputs the direct-current signal to one of the two signal lines; and the low-band communication unit of the second on-vehicle communication apparatus outputs the direct-current signal to another of the two signal lines.

Due to this configuration, between the first on-vehicle communication apparatus and the second on-vehicle communication apparatus, transmission of information using a direct-current signal or a low-band signal can be performed bidirectionally and simultaneously. Thus, the amount of information that can be transmitted per unit time by using the direct-current signal or the low-band signal can be increased.

(17) Preferably, the direct-current signal or the low-band signal includes management information indicating a state regarding a physical layer between the on-vehicle communication apparatus and the other on-vehicle communication apparatus, the communication information is information that does not include the management information, the management information includes failure diagnosis information, the low-band communication unit of the second on-vehicle communication apparatus receives the failure diagnosis information from the first on-vehicle communication apparatus and outputs the direct-current signal or the low-band signal including predetermined information to the differential signal line, and the first on-vehicle communication apparatus further includes a diagnosis unit configured to diagnose a failure in the second on-vehicle communication apparatus on the basis of a reception condition of the predetermined information from the second on-vehicle communication apparatus.

Due to this configuration, since the failure diagnosis information and the predetermined information can be transmitted by using the direct-current signal or the low-band signal, a failure in the second on-vehicle communication apparatus can be diagnosed without compressing the band of the high-band signal. When the first on-vehicle communication apparatus can receive predetermined information from the second on-vehicle communication apparatus, the first on-vehicle communication apparatus can recognize that the low-band communication unit and the processing unit processing the failure diagnosis information and the predetermined information in the second on-vehicle communication apparatus are operating, for example. When the first on-vehicle communication apparatus cannot receive predetermined information from the second on-vehicle communication apparatus, the first on-vehicle communication apparatus can determine that there is a high possibility that at least one of the processing unit and the low-band communication unit in the second on-vehicle communication apparatus has failed, for example.

(18) More preferably, the communication information is periodically transmitted from the second on-vehicle communication apparatus to the first on-vehicle communication apparatus, and when the high-band communication unit of the first on-vehicle communication apparatus is not able to receive the high-band signal including the communication information from the second on-vehicle communication apparatus for a predetermined time, the first on-vehicle communication apparatus outputs the direct-current signal or the low-band signal including the failure diagnosis information to the differential signal line.

Due to this configuration, when the first on-vehicle communication apparatus can receive predetermined information from the second on-vehicle communication apparatus, the first on-vehicle communication apparatus can recognize that the above processing unit is operating. Thus, the first on-vehicle communication apparatus can determine that there is a high possibility that the cause for being unable to receive the communication information is a failure of the high-band communication unit in the second on-vehicle communication apparatus. In addition, since the failure diagnosis information can be transmitted to the second on-vehicle communication apparatus in a condition where there is a high possibility that the second on-vehicle communication apparatus has failed, it is possible to prevent unnecessary transmission of the failure diagnosis information in a condition where the possibility that the second on-vehicle communication apparatus has failed is low.

(19) More preferably, the first on-vehicle communication apparatus periodically outputs the direct-current signal or the low-band signal including the failure diagnosis information to the differential signal line, and when the diagnosis unit is not able to receive the predetermined information from the second on-vehicle communication apparatus for a predetermined time, the diagnosis unit determines a failure in the second on-vehicle communication apparatus.

Due to this configuration, the first on-vehicle communication apparatus can periodically determine the presence or absence of a failure in the second on-vehicle communication apparatus. Thus, a failure in the second on-vehicle communication apparatus can be found early.

(20) A communication control method according to an embodiment of the present disclosure is to be performed in an on-vehicle communication apparatus configured to communicate with another on-vehicle communication apparatus by using one differential signal line. The communication control method includes the steps of: generating a high-band signal including communication information and outputting the high-band signal to the differential signal line; and generating a direct-current signal or a low-band signal and outputting the direct-current signal or the low-band signal to the differential signal line.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be outputted to one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

(21) A communication control method according to an embodiment of the present disclosure is to be performed in an on-vehicle communication apparatus configured to communicate with another on-vehicle communication apparatus by using one differential signal line. The communication control method includes the steps of: separating a high-band signal, and a direct-current signal or a low-band signal, from a signal received via the differential signal line; acquiring information from the separated high-band signal; and acquiring information from the separated direct-current signal or the separated low-band signal.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be separately received and outputted via one differential signal line, the band in which information can be transmitted by using one differential signal line can be expanded. Accordingly, the amount of information that can be transmitted per unit time in one differential signal line can be increased. Therefore, in the on-vehicle network, information can be efficiently transmitted with a simple configuration.

(22) A communication control program according to an embodiment of the present disclosure is to be used in an on-vehicle communication apparatus configured to communicate with another on-vehicle communication apparatus by using one differential signal line. The on-vehicle communication apparatus includes a high-band communication unit configured to generate a high-band signal including communication information and to output the high-band signal to the differential signal line, and a low-band communication unit configured to generate a direct-current signal or a low-band signal and to output the direct-current signal or the low-band signal to the differential signal line. The communication control program is configured to cause a computer to function as: a first transmission processing unit configured to transmit information via the high-band communication unit; and a second transmission processing unit configured to transmit information via the low-band communication unit.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be outputted to one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

(23) A communication control program according to an embodiment of the present disclosure is to be used in an on-vehicle communication apparatus configured to communicate with another on-vehicle communication apparatus by using one differential signal line. The on-vehicle communication apparatus includes: a separation unit capable of separating a high-band signal, and a direct-current signal or a low-band signal, from a signal received via the differential signal line; a high-band communication unit configured to acquire information from the high-band signal separated by the separation unit; and a low-band communication unit configured to acquire information from the direct-current signal or the low-band signal separated by the separation unit. The communication control program is configured to cause a computer to function as: a first reception processing unit configured to receive information via the high-band communication unit; and a second reception processing unit configured to receive information via the low-band communication unit.

Thus, due to the configuration in which on-vehicle communication apparatuses are connected to each other by one differential signal line, increase in the weight of the vehicle can be suppressed. In addition, since the number of signal lines can be reduced, wiring of the signal lines can be facilitated. Since the high-band signal, and the direct-current signal or the low-band signal can be separately received and outputted via one differential signal line, the band in which information can be transmitted by using one differential signal line can be expanded. Accordingly, the amount of information that can be transmitted per unit time in one differential signal line can be increased. Therefore, in the on-vehicle network, information can be efficiently transmitted with a simple configuration.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

First Embodiment

[Configuration and Basic Operation]

FIG. 1 shows a configuration of an on-vehicle communication system according to a first embodiment of the present disclosure.

With reference to FIG. 1, an on-vehicle communication system 301 includes switch devices 101A, 101B, and a plurality of on-vehicle communication devices 111. Hereinafter, each of the switch devices 101A, 101B will also be referred to as a switch device 101.

The on-vehicle communication system 301 is installed on a vehicle 1. The switch device 101 and the on-vehicle communication device 111 are examples of an on-vehicle communication apparatus.

The configuration of the on-vehicle communication system 301 is not limited to a configuration including three or more on-vehicle communication apparatuses, but may be a configuration including two on-vehicle communication apparatuses. Specifically, the on-vehicle communication system 301 may be configured by two switch devices 101, the on-vehicle communication system 301 may be configured by two on-vehicle communication devices 111, or the on-vehicle communication system 301 may be configured by one switch device 101 and one on-vehicle communication device 111.

The on-vehicle communication device 111 is, for example, a TCU (Telematics Communication Unit), a central gateway, a human machine interface, a camera, a sensor, an autonomous driving ECU, a navigation device, and the like. The on-vehicle communication device 111 can perform communication with the switch device 101.

The TCU can perform wireless communication with a wireless base station apparatus (not shown) in accordance with a communication standard of LTE (Long Term Evolution), 3G, or the like, and can perform communication with the switch device 101, for example.

The central gateway can perform communication via a CAN (Controller Area Network) with a control device such as an engine controller, and can perform communication with the switch device 101, for example.

The central gateway relays information communicated between the control device and another on-vehicle communication device 111.

The connection relationship among the switch device 101A, 101B and each on-vehicle communication device 111 in the on-vehicle network of the vehicle 1 is fixed, for example.

The switch devices 101A and 101B are connected to each other by an on-vehicle Ethernet (registered trademark) communication cable (hereinafter, also referred to as an Ethernet cable) 10, which is one example of a differential signal line. In addition, the switch device 101 is connected to an on-vehicle communication device 111 by an Ethernet cable 10, for example. Details of the differential signal line will be described later.

The on-vehicle communication apparatuses communicate with each other by using one differential signal line. Specifically, an on-vehicle communication apparatus communicates with another on-vehicle communication apparatus by using an Ethernet cable 10, for example.

More specifically, the switch devices 101A, 101B communicate with each other by using an Ethernet cable 10. A switch device 101 and an on-vehicle communication device 111 directly connected to the switch device 101 communicate with each other by using an Ethernet cable 10.

Between a switch device 101 and another on-vehicle communication apparatus directly connected to the switch device 101, information is communicated by using an Ethernet frame according to IEEE 802.3, for example.

For example, an on-vehicle communication device 111 transmits an Ethernet frame via one or a plurality of the switch devices 101 to another on-vehicle communication device 111.

The Ethernet frame includes the MAC (Media Access Control) address of the on-vehicle communication device 111 and the MAC address of the other on-vehicle communication device 111, as the sending source MAC address and the destination MAC address, for example.

Figure 2:
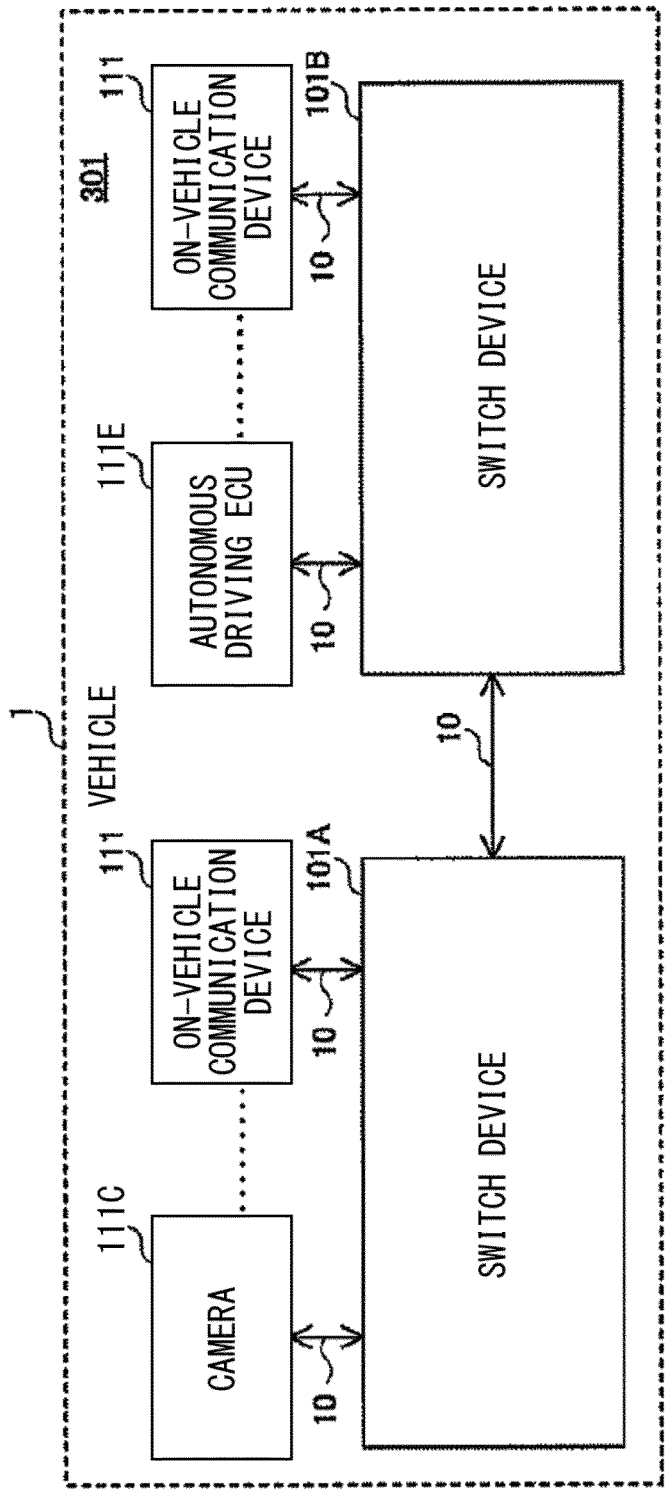
FIG. 2 shows an application example of the on-vehicle communication system according to the first embodiment of the present invention.

FIG. 2 shows an application example of the on-vehicle communication system according to the first embodiment of the present disclosure. FIG. 2 shows a camera 111C and an autonomous driving ECU 111E as specific examples of the on-vehicle communication device 111.

With reference to FIG. 2, the camera 111C is connected to the switch device 101A. The autonomous driving ECU 111E is connected to the switch device 101B.

For example, the camera 111C transmits an Ethernet frame including image information to the autonomous driving ECU 111E via the switch devices 101A, 101B.

The sending source and the destination of the Ethernet frame are not limited to on-vehicle communication devices 111 such as the camera 111C and the autonomous driving ECU 111E, but may be the switch devices 101.

In the on-vehicle communication system 301, other than the Ethernet frame above, an Ethernet frame as described below is transmitted. For example, a sensor transmits an Ethernet frame including a sensing result to the autonomous driving ECU 111E via one or a plurality of the switch devices 101. The TCU receives video information, sound information, map information, and the like from a wireless base station, and transmits an Ethernet frame including the received information to a navigation device via one or a plurality of the switch devices 101.

Specifically, the switch device 101 is a layer 2 (L2) switch, and upon receiving an Ethernet frame from an on-vehicle communication device 111, the switch device 101 refers to the destination MAC address included in the received Ethernet frame, and performs a relaying process of transmitting the Ethernet frame to another switch device 101 or the destination on-vehicle communication device 111 in accordance with the destination MAC address referred to.

[Configuration of On-Vehicle Communication Device 111]

Figure 3:
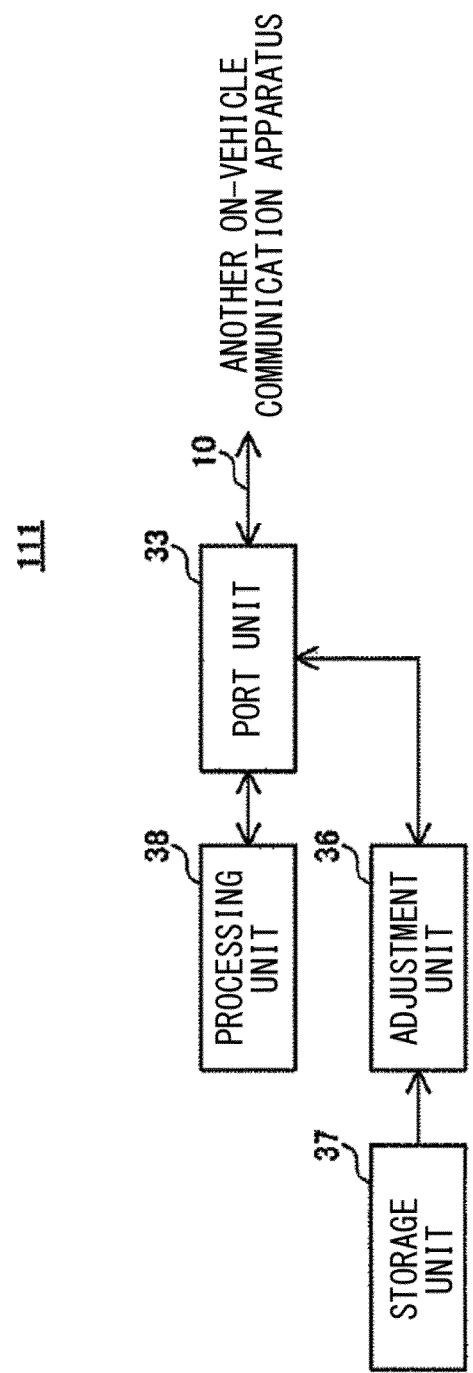
FIG. 3 shows a configuration of an on-vehicle communication device in the on-vehicle communication system according to the first embodiment of the present invention.

FIG. 3 shows a configuration of an on-vehicle communication device in the on-vehicle communication system according to the first embodiment of the present disclosure.

With reference to FIG. 3, the on-vehicle communication device 111 includes a port unit 33, an adjustment unit (second transmission processing unit and second reception processing unit) 36, a storage unit 37, and a processing unit (first transmission processing unit and first reception processing unit) 38.

Here, as one example of operation of an on-vehicle communication device 111, operation of the camera 111C is described. However, operations of on-vehicle communication devices 111 such as the TCU, the central gateway, the human machine interface, the sensor, the autonomous driving ECU 111E, and the navigation device are the same as the operation of the camera 111C.

The camera 111C takes an image of the surroundings of the vehicle 1 and creates image information indicating the taken image, for example. The camera 111C transmits an Ethernet frame including the created image information and the MAC address of the autonomous driving ECU 111E as the destination MAC address, to the autonomous driving ECU 111E via the switch devices 101A, 101B.

More specifically, the port unit 33 in the camera 111C is connected to another on-vehicle communication apparatus via an Ethernet cable 10, here, the switch device 101A.

The processing unit 38 creates an Ethernet frame including the taken image information and having the autonomous driving ECU 111E as the destination, and outputs the created Ethernet frame to the port unit 33, for example.

Upon receiving the Ethernet frame from the processing unit 38, the port unit 33 processes the received Ethernet frame and transmits the processed Ethernet frame to the switch device 101A via the Ethernet cable 10.

Meanwhile, when the port unit 33 receives an Ethernet frame from the switch device 101A via the Ethernet cable 10, the port unit 33 processes the received Ethernet frame, and outputs the processed Ethernet frame to the processing unit 38. Details of the operation of the port unit 33 will be described later.

Figure 4:
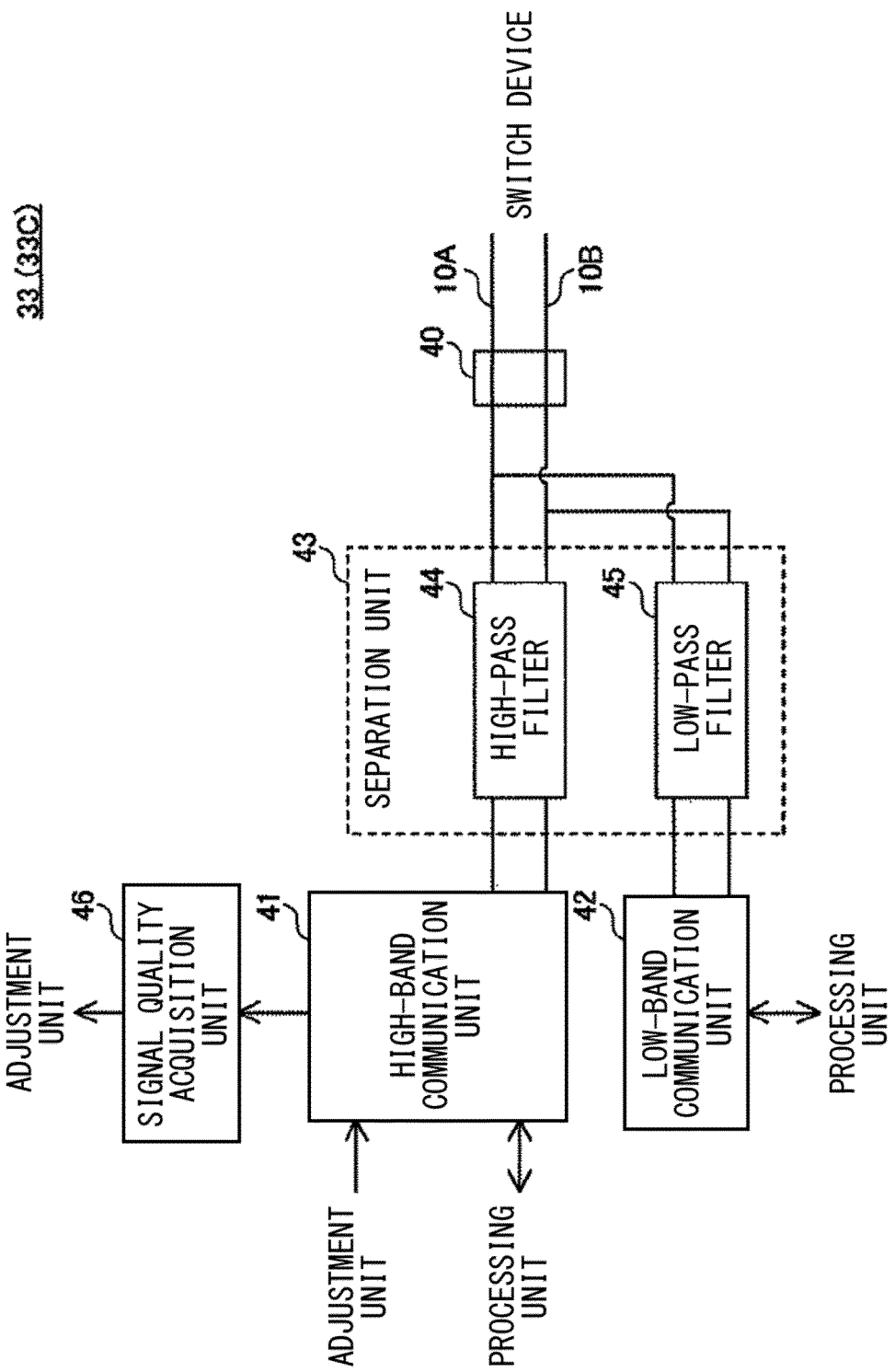
FIG. 4 shows a configuration of a port unit in an on-vehicle communication device according to the first embodiment of the present invention.

FIG. 4 shows a configuration of a port unit in an on-vehicle communication device according to the first embodiment of the present disclosure.

With reference to FIG. 4, the port unit 33 includes a connector 40, a high-band communication unit 41, a low-band communication unit 42, a separation unit 43, and a signal quality acquisition unit 46. The separation unit 43 includes a high-pass filter 44 and a low-pass filter 45.

The connector 40 in the port unit 33 can be connected to an Ethernet cable 10. The Ethernet cable 10 is a UTP (Unshielded Twisted Pair) cable, for example, and includes signal lines 10A, 10B.

The Ethernet cable 10 can transmit a direct-current signal, and a high-band signal according to a communication standard such as 100BASE-T1 or 1000BASE-T1, for example.

Here, being able to transmit a high-band signal and a direct-current signal means being able to simultaneously transmit the high-band signal and the direct-current signal. There is also a case where either one of the high-band signal and the direct-current signal is transmitted. In either case, a signal to be transmitted in the Ethernet cable 10 is transmitted. The carrier frequency of the high-band signal is 10 mega-hertz or higher, for example.

Figure 5:
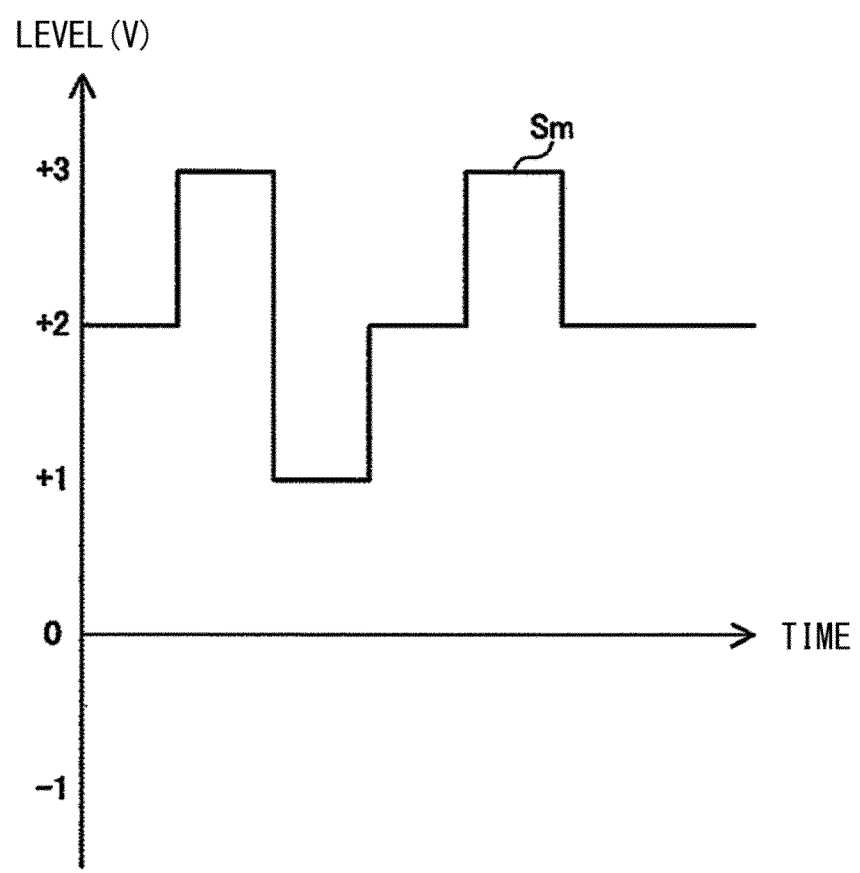
FIG. 5 shows one example of a mixed signal transmitted in an Ethernet cable connected between on-vehicle communication apparatuses according to the first embodiment of the present invention.

FIG. 5 shows one example of a mixed signal transmitted in an Ethernet cable connected between on-vehicle communication apparatuses according to the first embodiment of the present disclosure. In FIG. 5, the horizontal axis represents time, and the vertical axis represents level.

FIG. 5 shows temporal change of voltage difference between the signal lines 10A and 10B in the Ethernet cable 10. The voltage difference is the level of a mixed signal Sm in which a high-band signal and a direct-current signal are mixed. Here, the mixed signal Sm includes a direct-current signal having a level of 2 volts, and a high-band signal that oscillates between +1 volt and −1 volt.

Figure 6:
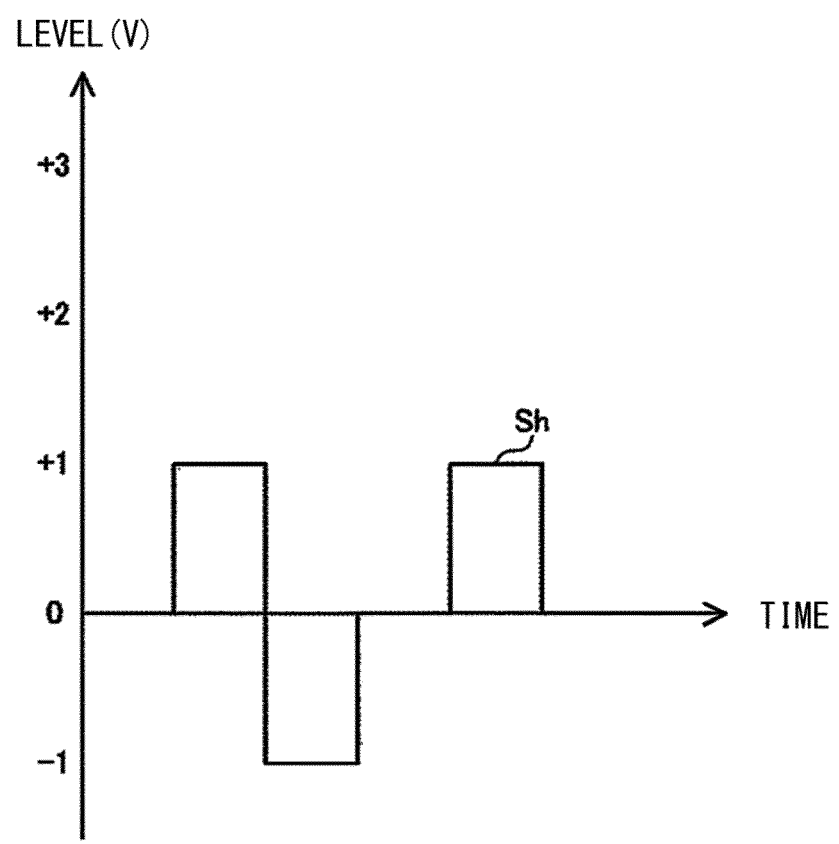
FIG. 6 shows one example of a high-band signal transmitted in an Ethernet cable at a switch device according to the first embodiment of the present invention.

FIG. 6 shows one example of a high-band signal transmitted in an Ethernet cable at a switch device according to the first embodiment of the present disclosure. The way to interpret FIG. 6 is the same as FIG. 5.

With reference to FIG. 4 and FIG. 6, the separation unit 43 can separate the high-band signal and the direct-current signal from a signal received via the differential signal line.

More specifically, the high-pass filter 44 in the separation unit 43 attenuates components of a predetermined frequency or lower, among frequency components of the electric signal passing through the high-pass filter 44.

Specifically, in the mixed signal Sm received via the Ethernet cable 10 and the connector 40 from another on-vehicle communication apparatus, here, the switch device 101A, the high-pass filter 44 attenuates the direct-current signal and allows a high-band signal Sh to pass therethrough.

Figure 7:
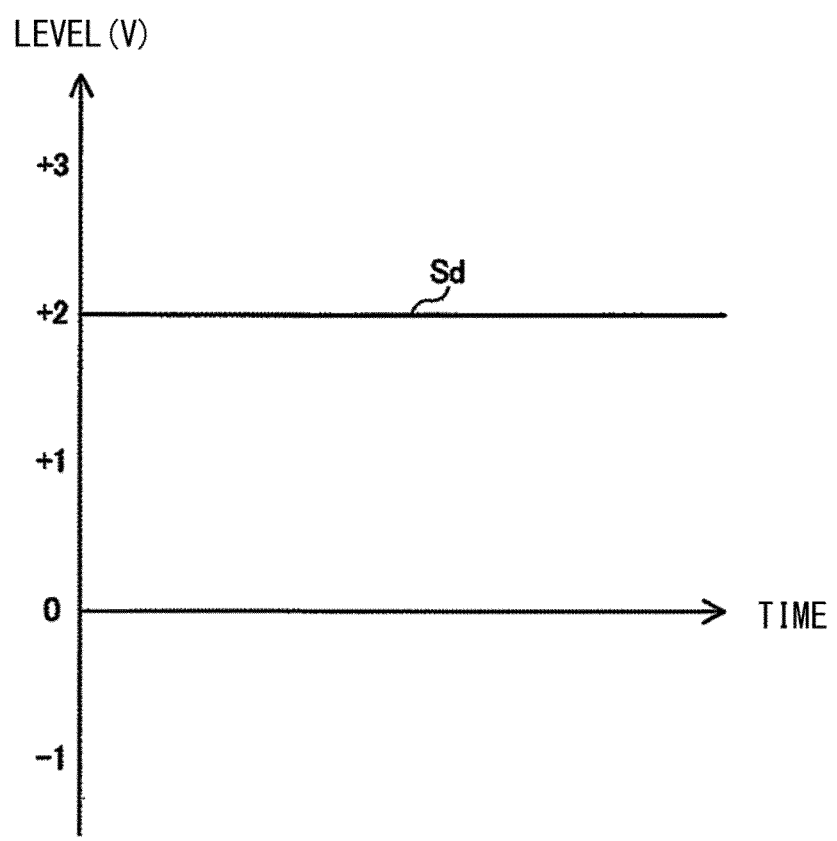
FIG. 7 shows one example of a direct-current signal transmitted in an Ethernet cable at a switch device according to the first embodiment of the present invention.

FIG. 7 shows one example of a direct-current signal transmitted in an Ethernet cable at a switch device according to the first embodiment of the present disclosure. The way to interpret FIG. 7 is the same as FIG. 5.

With reference to FIG. 7, the low-pass filter 45 attenuates components of a predetermined frequency or higher, among frequency components of the electric signal passing through the low-pass filter 45.

Specifically, in the mixed signal Sm received via the Ethernet cable 10 and the connector 40 from another on-vehicle communication apparatus, here, the switch device 101A, the low-pass filter 45 attenuates the high-band signal Sh and allows a direct-current signal Sd to pass therethrough.

[Configuration of Switch Device 101]

Figure 8:
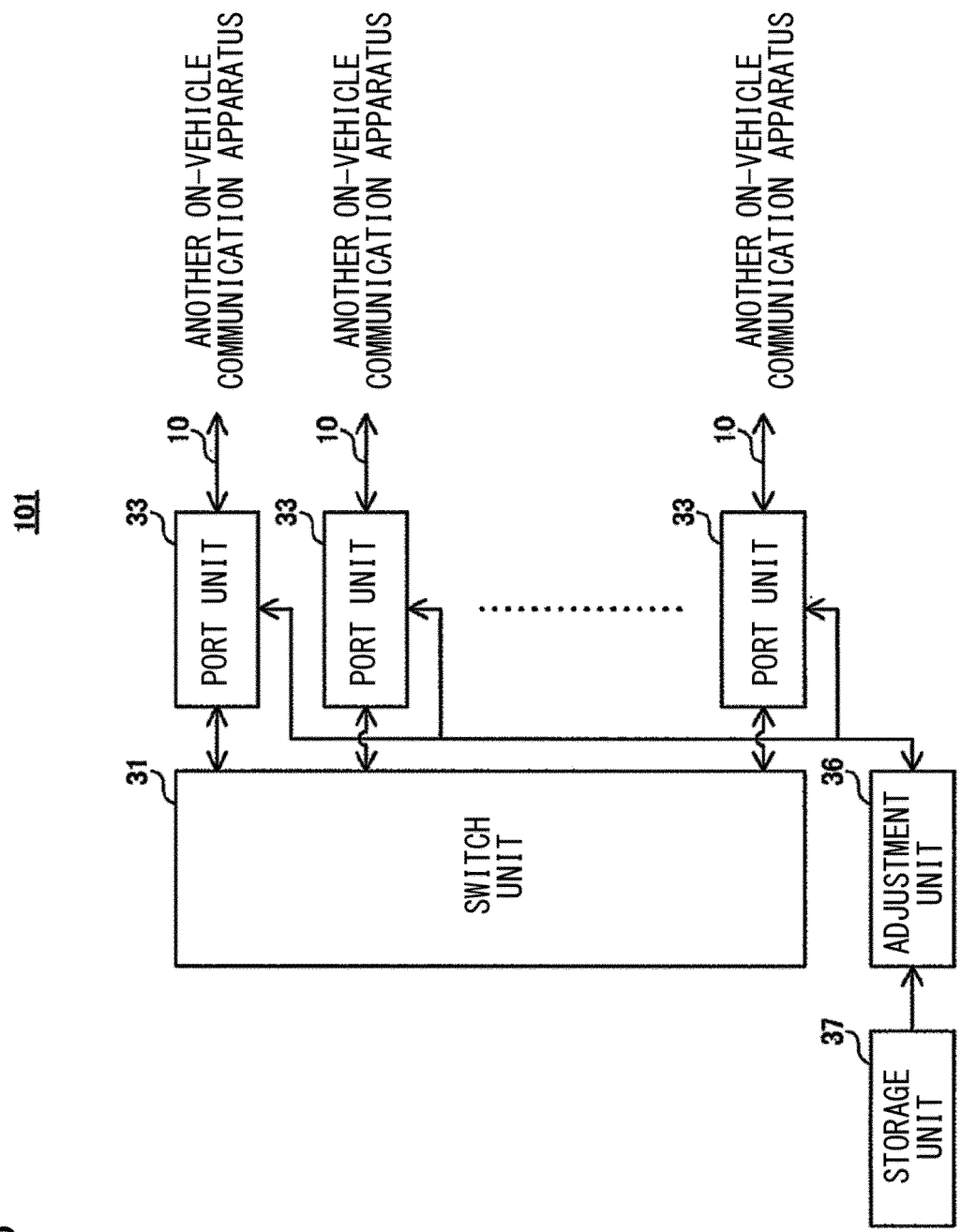
FIG. 8 shows a configuration of a switch device in the on-vehicle communication system according to the first embodiment of the present invention.

FIG. 8 shows a configuration of a switch device in the on-vehicle communication system according to the first embodiment of the present disclosure.

With reference to FIG. 8, the switch device 101 includes a switch unit (first transmission processing unit and first reception processing unit) 31, a plurality of port units 33, an adjustment unit (second transmission processing unit and second reception processing unit) 36, and a storage unit 37. A unique port number is assigned to the port unit 33.

The switch unit 31 operates as an L2 switch, for example, and upon receiving an Ethernet frame from a port unit 33, the switch unit 31 refers to the destination MAC address included in the received Ethernet frame.

The switch unit 31 holds an ARL (Address Resolution Logic) table indicating the correspondence relationship between the destination MAC address and the port number of the port unit 33 as the output destination, for example.

The content of the ARL table is determined in advance by, for example, a user on the basis of the connection relationship which is fixed as described above.

The switch unit 31 acquires, from the ARL table, the port number corresponding to the destination MAC address referred to, and transmits the received Ethernet frame to another switch device 101 or an on-vehicle communication device 111 via the port unit 33 that corresponds to the acquired port number.

The switch unit 31 may be able to operate also as a layer 3 (L3) switch.

[Transmission of High-Band Signal]

Figure 9:
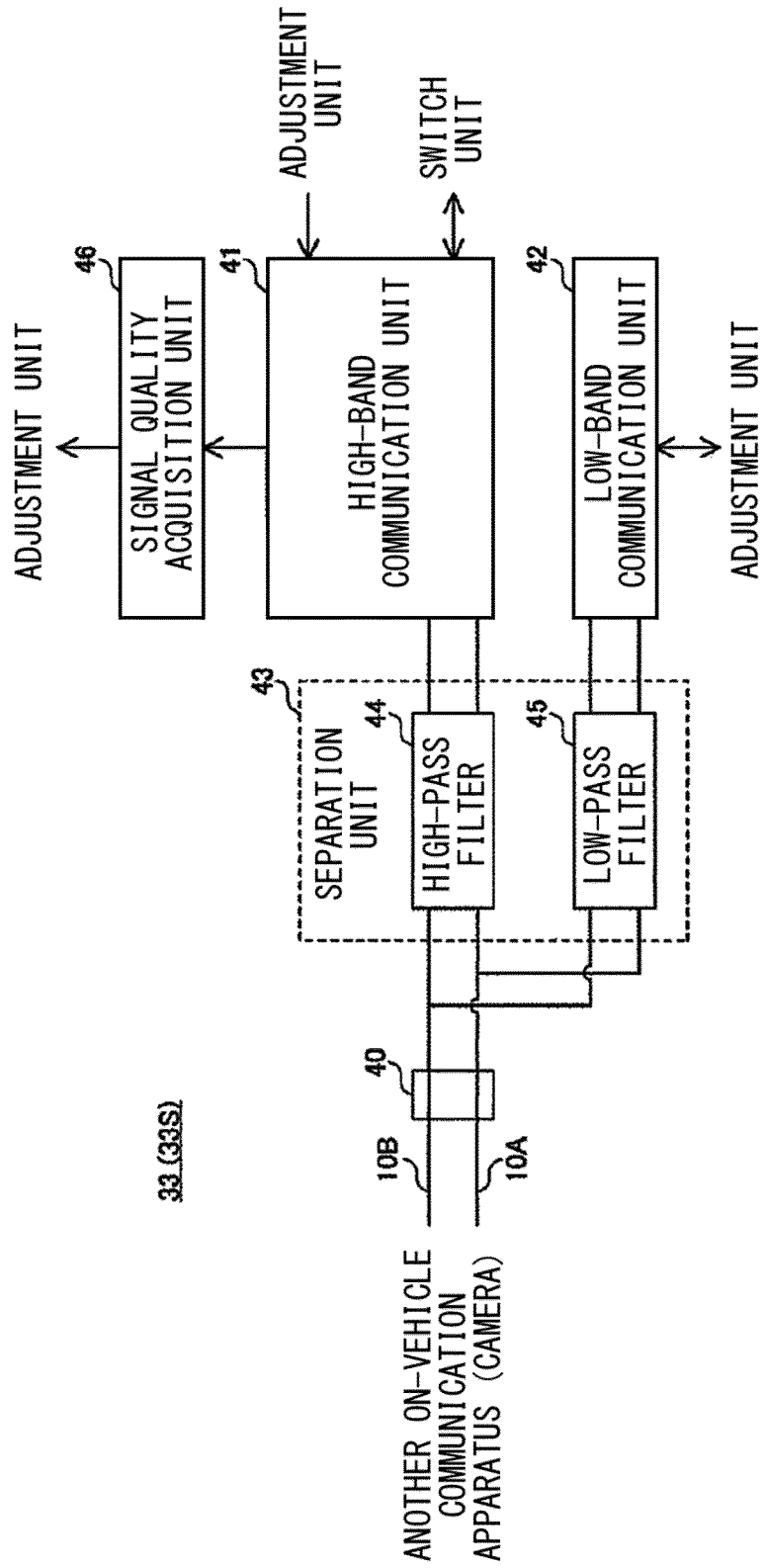
FIG. 9 shows a configuration of a port unit in a switch device according to the first embodiment of the present invention.

FIG. 9 shows a configuration of a port unit in a switch device according to the first embodiment of the present disclosure.

With reference to FIG. 9, the port unit 33 includes a connector 40, a high-band communication unit 41, a low-band communication unit 42, a separation unit 43, and a signal quality acquisition unit 46. The separation unit 43 includes a high-pass filter 44 and a low-pass filter 45.

In the following, in order to facilitate description, the port unit 33, in the switch device 101A, that is connected to the camera 111C via an Ethernet cable 10 is also referred to as a port unit 33S. In addition, the port unit 33 (see FIG. 4) in the camera 111C is also referred to as a port unit 33C.

Here, operation of the switch device 101A will be described as one example, but operation of the switch device 101B is the same as that of the switch device 101A.

A second end of an Ethernet cable 10 of which a first end is connected to the camera 111C is connected to the connector 40 in the port unit 33S.

With reference to FIG. 4 again, the high-band communication unit 41 in the port unit 33C of the camera 111C generates a high-band signal including communication information and outputs the high-band signal to the differential signal line. More specifically, the high-band communication unit 41 outputs the high-band signal to the signal line 10A in the Ethernet cable 10, for example.

Here, the communication information is information that does not include management information indicating the state regarding the physical layer between the on-vehicle communication apparatus and another on-vehicle communication apparatus, for example. Here, the communication information is an Ethernet frame that includes image information, for example.

Between the camera 111C and the switch device 101A, full duplex communication of the high-band signal is performed, for example.

That is, between the high-band communication unit 41 in the port unit 33C of the camera 111C and the high-band communication unit 41 in the port unit 33S of the switch device 101A, transmission of a high-band signal from the camera 111C to the switch device 101A and transmission of a high-band signal from the switch device 101A to the camera 111C can be simultaneously performed.

More specifically, for example, the high-band communication unit 41 in the port unit 33C has a hybrid circuit that can output to the signal line 10A a high-band signal (hereinafter, also referred to as a high-band transmission signal) from the camera 111C to the switch device 101A, and that can take out from the signal line 10B a high-band signal (hereinafter, also referred to as a high-band reception signal) transmitted from the switch device 101A to the camera 111C via the signal line 10B as described later.

For example, upon receiving an Ethernet frame including image information from the processing unit 38, the high-band communication unit 41 converts a bit string indicating the received Ethernet frame into a symbol string in accordance with a predetermined modulation method.

Starting from the symbol at the beginning in the converted symbol string in order, the high-band communication unit 41 generates a high-band signal having a level corresponding to the symbol, i.e., a high-band transmission signal, and outputs the generated high-band transmission signal to the signal line 10A via the high-pass filter 44, by using the hybrid circuit. Here, since the high-band transmission signal does not include a direct-current signal, the high-band transmission signal is scarcely subjected to attenuation action in the high-pass filter 44 and is transmitted to the switch device 101A via the connector 40 and the Ethernet cable 10.

With reference to FIG. 9 again, the high-band communication unit 41 in the port unit 33S of the switch device 101A acquires the communication information from the high-band signal separated by the separation unit 43.

More specifically, for example, the high-band communication unit 41 has a hybrid circuit that can output to the signal line 10B a high-band signal from the switch device 101A to the camera 111C, i.e., a high-band transmission signal, and that can take out from the signal line 10A a high-band signal from the camera 111C to the switch device 101A, i.e., a high-band reception signal.

The high-band communication unit 41 acquires, by using the hybrid circuit, the high-band signal that has been transmitted from the camera 111C via the signal line 10A and that has passed through the high-pass filter 44, i.e., a high-band reception signal.

The high-band communication unit 41 generates a symbol string by demodulating the high-band reception signal in accordance with a predetermined modulation method, and converts the generated symbol string into a bit string. Here, the converted bit string indicates the Ethernet frame. The high-band communication unit 41 outputs the bit string, i.e., the Ethernet frame, to the switch unit 31.

With reference to FIG. 8 again, upon receiving the Ethernet frame from the port unit 33S, the switch unit 31 transmits the received Ethernet frame to the switch device 101B via a port unit 33 connected to the switch device 101B.

With reference to FIG. 2 again, upon receiving the Ethernet frame from the switch device 101A, the switch device 101B relays the received Ethernet frame to transmit the Ethernet frame to the autonomous driving ECU 111E.

Upon receiving the Ethernet frame including the image information from the switch device 101B, the autonomous driving ECU 111E transmits to the switch device 101B an Ethernet frame that includes an ACK indicating reception acknowledgement, for example, and that includes the MAC address of the camera 111C as the destination MAC address.

Upon receiving the Ethernet frame from the autonomous driving ECU 111E, the switch device 101B relays the received Ethernet frame to transmit the Ethernet frame to the switch device 101A.

With reference to FIG. 8 again, upon receiving the Ethernet frame from the switch device 101B via the port unit 33 connected to the switch device 101B, the switch unit 31 outputs the received Ethernet frame to the port unit 33S.

With reference to FIG. 9 again, upon receiving the Ethernet frame from the switch unit 31, the high-band communication unit 41 in the port unit 33S of the switch device 101A generates a high-band signal that includes the received Ethernet frame and outputs the high-band signal to the differential signal line.

More specifically, the high-band communication unit 41 outputs the high-band signal to the signal line 10B in the Ethernet cable 10, for example.

The high-band communication unit 41 converts the bit string indicating the Ethernet frame received from the switch unit 31, into a symbol string in accordance with a predetermined modulation method, for example.

Starting from the symbol at the beginning in the converted symbol string in order, the high-band communication unit 41 generates a high-band signal having a level corresponding to the symbol, i.e., a high-band transmission signal, and outputs the generated high-band transmission signal to the signal line 10B via the high-pass filter 44, by using the hybrid circuit. The high-band transmission signal is transmitted to the camera 111C via the high-pass filter 44, the connector 40, and the Ethernet cable 10.

With reference to FIG. 4 again, the high-band communication unit 41 in the port unit 33C of the camera 111C acquires the communication information from the high-band signal separated by the separation unit 43.

More specifically, the high-band communication unit 41 acquires the high-band signal that has been transmitted from the switch device 101A via the signal line 10B and that has passed through the high-pass filter 44, i.e., a high-band reception signal.

The high-band communication unit 41 generates a symbol string by demodulating the high-band reception signal in accordance with a predetermined modulation method, and converts the generated symbol string into a bit string, i.e., the Ethernet frame that includes the ACK. The high-band communication unit 41 outputs the Ethernet frame to the processing unit 38.

With reference to FIG. 3 again, upon receiving the Ethernet frame from the port unit 33C, the processing unit 38 recognizes that the image information transmitted by the processing unit 38 has reached the autonomous driving ECU 111E, on the basis of the ACK included in the received Ethernet frame.

[Transmission of Direct-Current Signal]

By using a direct-current signal, the switch device 101A notifies the camera 111C of the reception quality of the high-band signal received from the camera 111C. By using a direct-current signal, the camera 111C notifies the switch device 101A of the reception quality of the high-band signal received from the switch device 101A.

With reference to FIG. 9 again, the signal quality acquisition unit 46 in the port unit 33S of the switch device 101A acquires a signal quality of a high-band reception signal.

More specifically, the signal quality acquisition unit 46 acquires an SQI (Signal Quality Indicator) indicating the reception quality of the high-band reception signal in the high-band communication unit 41.

The acquisition of the SQI is performed every time the high-band communication unit 41 receives one Ethernet frame, for example. The acquisition of the SQI may be performed every time the high-band communication unit 41 receives a plurality of Ethernet frames.

The SQI is expressed by an integer value in 16 levels of 1 to 16, for example. The signal quality acquisition unit 46 outputs SQI information indicating the acquired SQI to the adjustment unit 36.

FIG. 10 shows one example of a correspondence table held by the on-vehicle communication device and the switch device according to the first embodiment of the present disclosure.

With reference to FIG. 10, a correspondence table Tab1 indicates the correspondence relationship between the level range of direct-current signal and the content of management information. The correspondence table Tab1 is stored in the storage unit 37, for example.

The SQI has a value that corresponds to the value of a bit error rate (BER), for example. In this example, the greater the value of the SQI is, the greater the value of the BER is, i.e., the worse the communication quality is.

Specifically, for example, when the value of the SQI is 1 to 5 (hereinafter, this range is also referred to as a good range), the communication quality is good. When the value of the SQI is 6 to 11 (hereinafter, this range is also referred to as a normal range), the communication quality is medium. When the value of the SQI is 12 to 16 (hereinafter, this range is also referred to as an adjustment-requiring range), the communication quality is bad.

With reference to FIG. 8 again, upon receiving the SQI information from the signal quality acquisition unit 46 in the port unit 33S, the adjustment unit 36 in the switch device 101A refers to the correspondence table Tab1 (see FIG. 10) held by the storage unit 37, and acquires a level range of the direct-current signal corresponding to the SQI indicated by the SQI information.

Specifically, for example, when the value of the SQI is 2, the adjustment unit 36 specifies 1.5 V to 2.0 V as the level range of the direct-current signal including the value. Then, the adjustment unit 36 outputs to the port unit 33S a transmission command for a direct-current signal of 1.75 V, which is an intermediate voltage between 1.5 V and 2.0 V, for example. This transmission command is one example of management information described later.

With reference to FIG. 9 again, the low-band communication unit 42 in the port unit 33S generates a direct-current signal that includes the management information, and outputs the direct-current signal to the differential signal line, for example. More specifically, the low-band communication unit 42 outputs the direct-current signal to one of the signal lines in the Ethernet cable 10, here, the signal line 10B. The management information includes the communication quality between the switch device 101A and the camera 111C, for example.

Between the switch device 101A and the camera 111C, full duplex communication of the direct-current signal is performed, for example.

That is, between low-band communication unit 42 in the port unit 33S of the switch device 101A and the low-band communication unit 42 in the port unit 33C of the camera 111C, transmission of a direct-current signal from the switch device 101A to the camera 111C and transmission of a direct-current signal from the camera 111C to the switch device 101A can be simultaneously performed.

For example, the low-band communication unit 42 in the port unit 33S has a hybrid circuit that can output to the signal line 10B a direct-current signal (hereinafter, also referred to as a direct-current transmission signal) from the switch device 101A to the camera 111C and that can take out from the signal line 10A a direct-current signal (hereinafter, also referred to as a direct-current reception signal) transmitted from the camera 111C to the switch device 101A via the signal line 10A as described later.

For example, a direct-current signal having a level corresponding to the communication quality is transmitted via the differential signal line.

Specifically, upon receiving the transmission command from the adjustment unit 36, the low-band communication unit 42 generates a direct-current signal in accordance with the received transmission command.

More specifically, for example, the low-band communication unit 42 has a DA (digital-analog) converter and an AD (analog-digital) converter.

The low-band communication unit 42 generates a direct-current signal having a level corresponding to the transmission command, by using the DA converter.

The level of this direct-current signal indicates the management information. Here, the low-band communication unit 42 generates a direct-current signal of 1.75 V, for example.

The low-band communication unit 42 outputs the generated direct-current signal to the signal line 10B via the low-pass filter 45, by using the hybrid circuit. Here, since the direct-current signal does not include the high-band signal, the direct-current signal is scarcely subjected to attenuation action in the low-pass filter 45 and is transmitted to the camera 111C via the connector 40 and the Ethernet cable 10.

With reference to FIG. 4 again, the low-band communication unit 42 in the port unit 33C of the camera 111C acquires information from a direct-current signal separated by the separation unit 43.

More specifically, for example, the low-band communication unit 42 has a hybrid circuit that can output to the signal line 10A a direct-current signal from the camera 111C to the switch device 101A, i.e., a direct-current transmission signal, and that can take out from the signal line 10B a direct-current signal from the switch device 101A to the camera 111C, i.e., a direct-current reception signal.

The low-band communication unit 42 acquires, by using the hybrid circuit, the direct-current signal that has been transmitted from the switch device 101A via the signal line 10B and that has passed through the low-pass filter 45, i.e., a direct-current reception signal.

The low-band communication unit 42 has a DA converter and an AD converter, similar to the low-band communication unit 42 in the port unit 33S, for example.

By using the AD converter, the low-band communication unit 42 detects the level of the direct-current reception signal for each predetermined sampling period, for example. The sampling period is greater than the reciprocal of the carrier frequency of the high-band signal.

The low-band communication unit 42 outputs, to the adjustment unit 36, level information which indicates the detected level and which is one example of the management information.

Meanwhile, the signal quality acquisition unit 46 acquires an SQI indicating the reception quality of the high-band reception signal in the high-band communication unit 41, and outputs SQI information indicating the acquired SQI, to the adjustment unit 36.

With reference to FIG. 3 again, the adjustment unit 36 in the camera 111C adjusts the operation of an amplifier included in the high-band communication unit 41, in accordance with the communication quality acquired by the low-band communication unit 42, for example.

More specifically, upon receiving the level information from the low-band communication unit 42, the adjustment unit 36 refers to the correspondence table Tab1 (see FIG. 10) held by the storage unit 37 and specifies a level range that includes the level indicated by the received level information.

Here, since the level indicated by the level information is 1.75 V, the adjustment unit 36 specifies 1.5 V to 2.0 V as the level range that includes the level, for example.

The adjustment unit 36 acquires 2, which is the value of the SQI corresponding to the specified level range. This value of the SQI is the reception quality in the switch device 101A. The adjustment unit 36 recognizes that the reception quality in the switch device 101A is good because the value of the SQI, i.e., 2, is included in the good range, and maintains the operation of the amplifier in the high-band communication unit 41.

Meanwhile, upon receiving the SQI information from the signal quality acquisition unit 46 in the port unit 33C, the adjustment unit 36 refers to the correspondence table Tab1 (see FIG. 10) held by the storage unit 37, and acquires a level range of the direct-current signal corresponding to the SQI indicated by the SQI information.

Specifically, for example, when the value of the SQI is 15, the adjustment unit 36 specifies 8.0 V to 8.5 V as the level range of the direct-current signal including the value. Then, the adjustment unit 36 outputs to the port unit 33C a transmission command for a direct-current signal of 8.25 V, which is an intermediate voltage between 8.0 V and 8.5 V, for example.

With reference to FIG. 4 again, the low-band communication unit 42 in the port unit 33C generates a direct-current signal that includes management information, and outputs the direct-current signal to the other of the signal line, here, the signal line 10A, in the Ethernet cable 10, for example.

Specifically, upon receiving the transmission command from the adjustment unit 36, the low-band communication unit 42 generates a direct-current signal in accordance with the received transmission command.

More specifically, the low-band communication unit 42 generates a direct-current signal having a level corresponding to the transmission command, by using the DA converter. Here, the low-band communication unit 42 generates a direct-current signal of 8.25 V, for example.

The low-band communication unit 42 outputs the generated direct-current signal to the signal line 10A via the low-pass filter 45, by using the hybrid circuit. The direct-current signal is transmitted to the switch device 101A via the low-pass filter 45, the connector 40, and the Ethernet cable 10.

With reference to FIG. 9 again, the low-band communication unit 42 in the port unit 33S of the switch device 101A acquires information from the direct-current signal separated by the separation unit 43.

More specifically, the low-band communication unit 42 acquires, by using the hybrid circuit, the direct-current signal that has been transmitted from the camera 111C via the signal line 10A and that has passed through the low-pass filter 45, i.e., a direct-current reception signal.

The low-band communication unit 42 detects the level of the acquired direct-current reception signal by using the AD converter, similar to the low-band communication unit 42 in the port unit 33C.

The low-band communication unit 42 outputs, to the adjustment unit 36, level information which indicates the detected level and which is one example of the management information.

With reference to FIG. 8 again, upon receiving the level information from the low-band communication unit 42, the adjustment unit 36 in the switch device 101A refers to the correspondence table Tab1 (see FIG. 10) held by the storage unit 37 and specifies a level range that includes the level indicated by the received level information.

Here, since the level indicated by the level information is 8.25 V, the adjustment unit 36 specifies 8.0 V to 8.5 V as the level range that includes the level, for example.

The adjustment unit 36 acquires 15, which is the value of the SQI corresponding to the specified level range. This value of the SQI is the reception quality in the camera 111C. The adjustment unit 36 recognizes that the reception quality in the camera 111C is bad because the value of the SQI, i.e., 15, is included in the adjustment-requiring range, and adjusts the amplifier in the high-band communication unit 41.

Specifically, the adjustment unit 36 increases the gain of the amplifier in the high-band communication unit 41, and increases the reception intensity, in the camera 111C, of the high-band signal transmitted by the switch device 101A, for example.

When an active filter is included in the high-band communication unit 41, for example, the adjustment unit 36 may adjust the cut-off frequency in the active filter in accordance with the increase in the gain of the amplifier.

The transmission of a high-band signal and a direct-current signal between an on-vehicle communication device 111 and a switch device 101 has been described in detail using the transmission between the camera 111C and the switch device 101A as an example. However, the transmission of a high-band signal and a direct-current signal between two switch devices 101 is also similar to the transmission between an on-vehicle communication device 111 and a switch device 101.

[Operation Flow]

Each of the apparatuses in the on-vehicle communication system 301 includes a computer. An arithmetic processing unit such as a CPU in the computer reads out a program including a part or all of steps in the sequence diagram or flow chart described below from a memory (not shown), and executes the program. The programs for the plurality of apparatuses can be installed from outside. The programs for the plurality of apparatuses are each distributed in a state of being stored in a storage medium.

Figure 11:
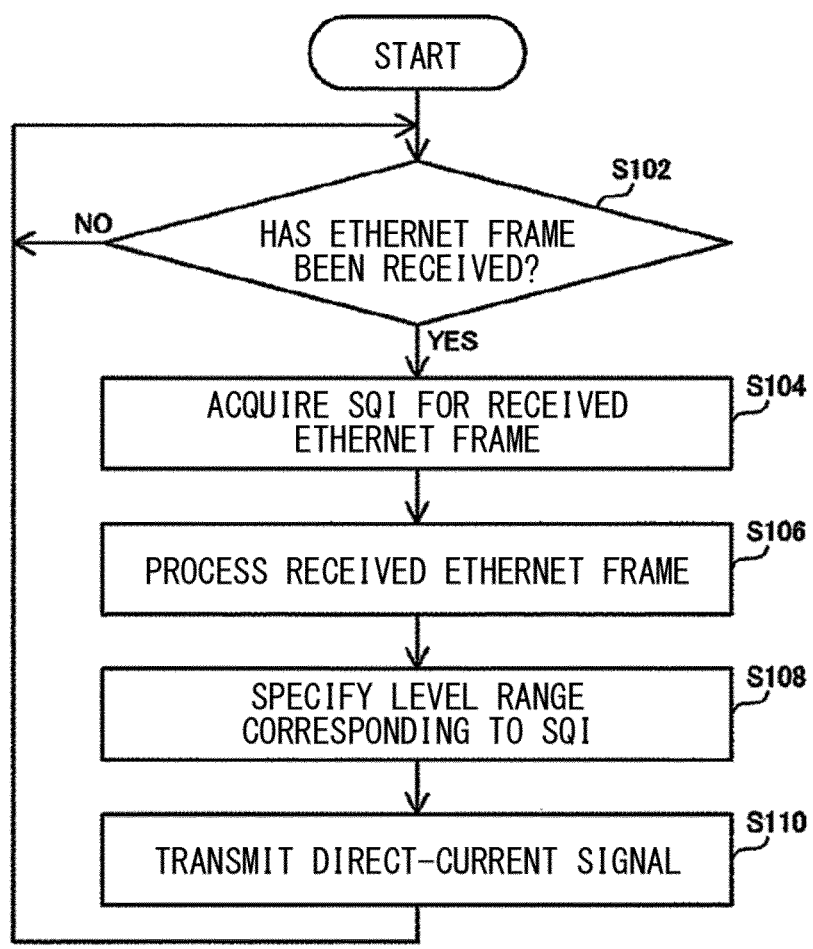
FIG. 11 is a flow chart of an operation procedure in a case where an on-vehicle communication apparatus receives an Ethernet frame in the on-vehicle communication system according to the first embodiment of the present invention.

FIG. 11 is a flow chart of an operation procedure in a case where an on-vehicle communication apparatus receives an Ethernet frame in the on-vehicle communication system according to the first embodiment of the present disclosure.

With reference to FIG. 11, first, an on-vehicle communication apparatus waits until receiving an Ethernet frame from another on-vehicle communication apparatus via the high-band communication unit 41 (NO in step S102).

Then, upon receiving the Ethernet frame from the other on-vehicle communication apparatus via the high-band communication unit 41 (YES in step S102), the on-vehicle communication apparatus acquires an SQI for the received Ethernet frame (step S104).

Next, the on-vehicle communication apparatus processes the received Ethernet frame (step S106).

Next, based on the correspondence table Tab1 (see FIG. 10), the on-vehicle communication apparatus specifies a level range of a direct-current signal corresponding to the acquired SQI (step S108).

Next, the on-vehicle communication apparatus transmits a direct-current signal of an intermediate voltage in the specified level range to the other on-vehicle communication apparatus via the low-band communication unit 42 (step S110).

Next, the on-vehicle communication apparatus waits until receiving a new Ethernet frame from the other on-vehicle communication apparatus via the high-band communication unit 41 (NO in step S102).

In a case where the on-vehicle communication apparatus is a switch device 101, for example, the on-vehicle communication apparatus transfers the received Ethernet frame in step S106 above.

The order of step S106, and steps S108 and S110 is not limited to that indicated above, and may be switched with each other.

Figure 12:
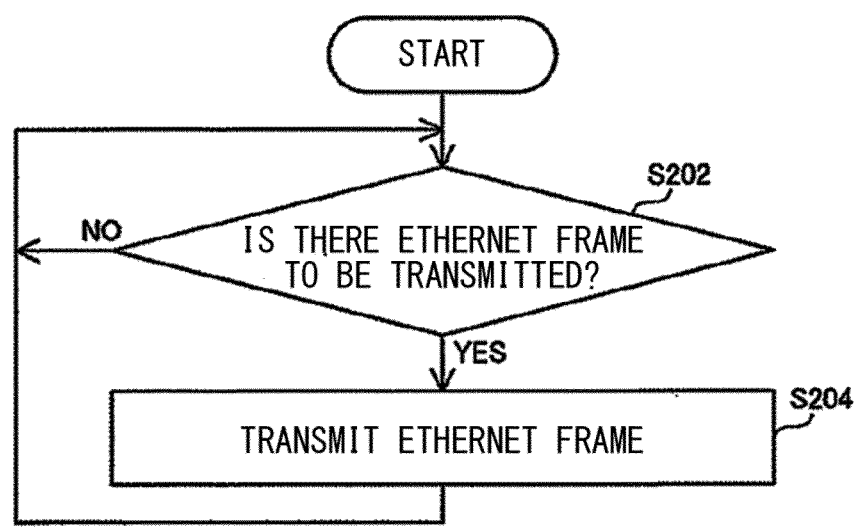
FIG. 12 is a flow chart of an operation procedure in a case where an on-vehicle communication apparatus transmits an Ethernet frame in the on-vehicle communication system according to the first embodiment of the present invention.

FIG. 12 is a flow chart of an operation procedure in a case where an on-vehicle communication apparatus transmits an Ethernet frame in the on-vehicle communication system according to the first embodiment of the present disclosure.

With reference to FIG. 12, first, when there is no Ethernet frame to be transmitted, the on-vehicle communication apparatus waits (NO in step S202).

When there is an Ethernet frame to be transmitted (YES in step S202), the on-vehicle communication apparatus transmits the Ethernet frame via the high-band communication unit 41 (step S204).

Next, when there is no new Ethernet frame to be transmitted, the on-vehicle communication apparatus waits (NO in step S202).

Figure 13:
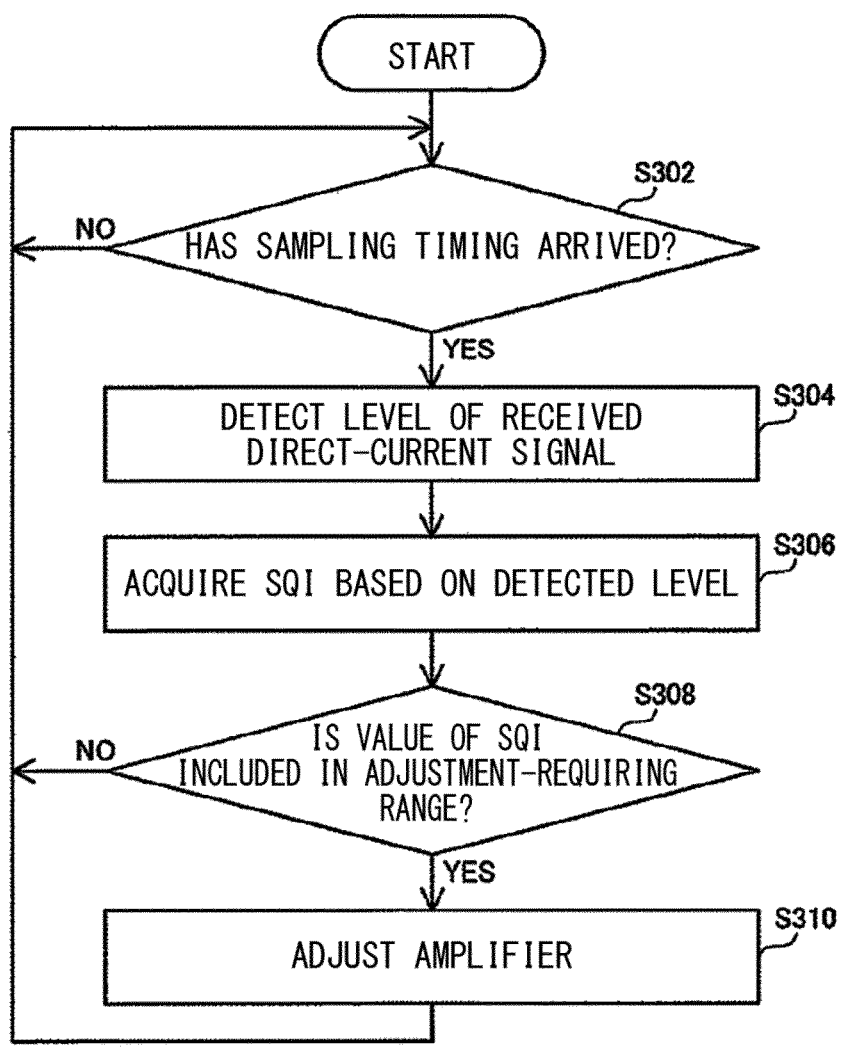
FIG. 13 is a flow chart of an operation procedure in a case where an on-vehicle communication apparatus receives management information in the on-vehicle communication system according to the first embodiment of the present invention.

FIG. 13 is a flow chart of an operation procedure in a case where an on-vehicle communication apparatus receives management information in the on-vehicle communication system according to the first embodiment of the present disclosure.

With reference to FIG. 13, first, the on-vehicle communication apparatus waits until a predetermined sampling timing arrives (NO in step S302).

Then, when the predetermined sampling timing has arrived (YES in step S302), the on-vehicle communication apparatus detects the level of a direct-current signal received via the low-band communication unit 42 (step S304).

Next, based on the correspondence table Tab1 (see FIG. 10), the on-vehicle communication apparatus acquires an SQI corresponding to the detected level (step S306).

Next, when the value of the acquired SQI is included in an adjustment-requiring range (YES in step S308), the on-vehicle communication apparatus adjusts the amplifier in the high-band communication unit 41 (step S310).

Next, the on-vehicle communication apparatus waits until a new sampling timing arrives (NO in step S302).

[Modification of Signal Transmitted/Received by Low-Band Communication Unit]

In the on-vehicle communication apparatus according to the first embodiment of the present disclosure, the low-band communication unit 42 is configured to generate a direct-current signal and output the direct-current signal to the differential signal line, but the present disclosure is not limited thereto. The low-band communication unit 42 may be configured to generate a low-band signal and to output the low-band signal to the differential signal line.

In the on-vehicle communication apparatus according to the first embodiment of the present disclosure, the low-band communication unit 42 is configured to acquire information from a direct-current signal separated by the separation unit 43, but the present disclosure is not limited thereto. The low-band communication unit 42 may be configured to acquire information from a low-band signal separated by the separation unit 43.

More specifically, the carrier frequency of the low-band signal is less than 1 mega-hertz, for example. With reference to FIG. 4 and FIG. 9 again, in the mixed signal received from another on-vehicle communication apparatus via the Ethernet cable 10 and the connector 40, the low-pass filter 45 in the separation unit 43 attenuates the high-band signal and allows the low-band signal to pass therethrough.

FIG. 14 shows one example of a correspondence table held by an on-vehicle communication device and a switch device according to the first embodiment of the present disclosure.

With reference to FIG. 14, a correspondence table Tab2 indicates the correspondence relationship between the amplitude range of low-band signal and the content of management information. The correspondence table Tab2 is stored in the storage unit 37, for example.

For example, a low-band signal having an amplitude corresponding to the communication quality is transmitted via the differential signal line.

Specifically, for example, upon receiving SQI information from the signal quality acquisition unit 46 in the port unit 33C, the adjustment unit 36 (see FIG. 3) in the camera 111C refers to the correspondence table Tab2 held by the storage unit 37, and acquires an amplitude range of the low-band signal corresponding to the SQI indicated by the SQI information.

Specifically, for example, when the value of the SQI is 15, the adjustment unit 36 specifies 8.0 V to 8.5 V as the amplitude range of the low-band signal including the value. Then, the adjustment unit 36 outputs to the port unit 33C a transmission command for a low-band signal having an amplitude of 8.25 V, which is an intermediate voltage between 8.0 V and 8.5 V, for example.

Upon receiving the transmission command from the adjustment unit 36, the low-band communication unit 42 (see FIG. 4) in the port unit 33C generates, by using the DA converter, a low-band signal having an amplitude corresponding to the transmission command in accordance with the received transmission command.

This amplitude of the low-band signal indicates the management information. Here, the low-band communication unit 42 generates a low-band signal having an amplitude of 8.25 V, for example.

The low-band communication unit 42 outputs the generated low-band signal to the signal line 10A via the low-pass filter 45, by using the hybrid circuit. Here, since the low-band signal does not include the high-band signal, the low-band signal is scarcely subjected to attenuation action in the low-pass filter 45, and is transmitted to the switch device 101A via the connector 40 and the Ethernet cable 10.

The low-band communication unit 42 (see FIG. 9) in the port unit 33S of the switch device 101A acquires, by using the hybrid circuit, the low-band signal that has been transmitted from the camera 111C via the signal line 10A and that has passed through the low-pass filter 45.

The low-band communication unit 42 detects the amplitude of the acquired low-band signal by using the AD converter, and outputs, to the adjustment unit 36, amplitude information which indicates the detected amplitude and which is one example of the management information.

Upon receiving the amplitude information from the low-band communication unit 42, the adjustment unit 36 (see FIG. 8) in the switch device 101A refers to the correspondence table Tab2 held by the storage unit 37, and specifies an amplitude range that includes the amplitude indicated by the received amplitude information.

Here, since the amplitude indicated by the amplitude information is 8.25 V, the adjustment unit 36 specifies 8.0 V to 8.5 V as the amplitude range that includes the amplitude, for example.

The adjustment unit 36 acquires 15, which is the value of the SQI corresponding to the specified amplitude range. This value of the SQI is the reception quality of in the camera 111C. The adjustment unit 36 recognizes that the reception quality in the camera 111C is bad because the value of the SQI, i.e., 15, is included in the adjustment-requiring range, and adjusts the amplifier in the high-band communication unit 41.

In the switch device according to the first embodiment of the present disclosure, the port unit 33 is provided inside the switch device 101, but the present disclosure is not limited thereto. The port unit 33 may be provided, as an on-vehicle communication apparatus, outside the switch device 101.

In the on-vehicle communication device according to the first embodiment of the present disclosure, the port unit 33 is provided inside the on-vehicle communication device 111, but the present disclosure is not limited thereto. The port unit 33 may be provided, as an on-vehicle communication apparatus, outside the on-vehicle communication device 111.

In the on-vehicle communication system according to the first embodiment of the present disclosure, on-vehicle communication apparatuses are configured to be connected to each other by the Ethernet cable 10, but the present disclosure is not limited thereto. On-vehicle communication apparatuses may be connected to each other by a cable different from the Ethernet cable 10 as long as the cable is a differential signal line.

In the on-vehicle communication system according to the first embodiment of the present disclosure, in each of the communication paths, both of transmission of a high-band signal and transmission of a direct-current signal or a low-band signal are performed. However, the present disclosure is not limited thereto. In a part of the communication paths, only transmission of a high-band signal may be performed.

In the on-vehicle communication system according to the first embodiment of the present disclosure, a direct-current signal or a low-band signal includes management information, and a high-band signal includes communication information that does not include the management information. However, the present disclosure is not limited thereto. For example, a configuration may be employed in which a part of the management information is transmitted by a direct-current signal or a low-band signal and communication information that includes a part of the remaining management information is transmitted by a high-band signal.

In the on-vehicle communication system according to the first embodiment of the present disclosure, the low-band communication unit 42 of the camera 111C outputs a direct-current signal to the signal line 10A of the Ethernet cable 10, and the low-band communication unit 42 of the switch device 101A outputs a direct-current signal to the signal line 10B of the Ethernet cable 10. However, the present disclosure is not limited thereto. The low-band communication unit 42 of the camera 111C and the low-band communication unit 42 of the switch device 101A may be configured to output a direct-current signal to both of the signal lines 10A and 10B of the Ethernet cable 10. Specifically, for example, by assigning transmission periods to the camera 111C and the switch device 101A so as not to overlap each other, half duplex communication in which one-way communication is alternately performed may be performed.

In the on-vehicle communication system according to the first embodiment of the present disclosure, a direct-current signal having a level corresponding to the communication quality, or a low-band signal having an amplitude corresponding to the communication quality is transmitted via a differential signal line. However, the present disclosure is not limited thereto. A direct-current signal which is turned on or off in a pattern corresponding to the communication quality, or a low-band signal modulated in accordance with the communication quality may be transmitted via the differential signal line.

In the on-vehicle communication apparatus according to the first embodiment of the present disclosure, the adjustment unit 36 is configured to adjust the operation of the amplifier included in the high-band communication unit 41, in accordance with the communication quality between the on-vehicle communication apparatus and another on-vehicle communication apparatus. However, the present invention is not limited thereto. The adjustment unit 36 may adjust the communication speed of the high-band signal transmitted by the high-band communication unit 41, in accordance with the communication quality.

In the on-vehicle communication apparatus according to the first embodiment of the present disclosure, the carrier frequency of the high-band signal is 10 mega-hertz or higher. However, the present disclosure is not limited thereto. The carrier frequency of the high-band signal may be less than 10 mega-hertz as long as the high-band signal can be separated from the direct-current signal and the low-band signal by the separation unit 43.

In the on-vehicle communication apparatus according to the first embodiment of the present disclosure, the carrier frequency of the low-band signal is less than 1 mega-hertz. However, the present disclosure is not limited thereto. The carrier frequency of the low-band signal may be 1 mega-hertz or higher as long as the low-band signal can be separated from the high-band signal by the separation unit 43.

In the on-vehicle communication apparatus according to the first embodiment of the present disclosure, the communication information is an Ethernet frame according to IEEE 802.3. However, the present disclosure is not limited thereto. The communication information may be a message or the like according to a communication standard for CAN, for example.

Meanwhile, in the on-vehicle network described in PATENT LITERATURE 1, data is transmitted and received between on-vehicle ECUs and between an on-vehicle ECU and a communication gateway.

As a method for efficiently transmitting such data, it is conceivable to provide a plurality of signal lines between apparatuses. However, when a plurality of signal lines are provided, the weight of the vehicle is increased. In addition, when taking space in the vehicle into consideration, a smaller number of signal lines facilitates wiring.

In contrast, the on-vehicle communication apparatus according to the first embodiment of the present disclosure communicates with another on-vehicle communication apparatus by using one differential signal line. The high-band communication unit 41 generates a high-band signal including communication information, and outputs the high-band signal to the differential signal line. The low-band communication unit 42 generates a direct-current signal or a low-band signal and outputs the direct-current signal or the low-band signal to the differential signal line.

Thus, due to the configuration in which on-vehicle communication apparatuses are connected to each other by one differential signal line, increase in the weight of the vehicle 1 can be suppressed. In addition, since the number of signal lines can be reduced, wiring of the signal lines can be facilitated. Since the high-band signal, and the direct-current signal or the low-band signal can be outputted to one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

The on-vehicle communication apparatus according to the first embodiment of the present disclosure communicates with another on-vehicle communication apparatus by using one differential signal line. The separation unit 43 can separate a high-band signal including communication information, and a direct-current signal or a low-band signal from a signal received via the differential signal line. The high-band communication unit 41 acquires the communication information from the high-band signal separated by the separation unit 43. The low-band communication unit 42 acquires information from the direct-current signal or the low-band signal separated by the separation unit 43.

Thus, due to the configuration in which on-vehicle communication apparatuses are connected to each other by one differential signal line, increase in the weight of the vehicle 1 can be suppressed. In addition, since the number of signal lines can be reduced, wiring of the signal lines can be facilitated. Since the high-band signal, and the direct-current signal or the low-band signal can be separately received and outputted via one differential signal line, the band in which information can be transmitted by using one differential signal line can be expanded. Accordingly, the amount of information that can be transmitted per unit time in one differential signal line can be increased. Therefore, in the on-vehicle network, information can be efficiently transmitted with a simple configuration.

In the on-vehicle communication apparatus according to the first embodiment of the present disclosure, the direct-current signal or the low-band signal includes management information indicating the state regarding the physical layer between the on-vehicle communication apparatus and another on-vehicle communication apparatus. The communication information is information that does not include the management information.

Thus, due to the configuration in which the management information is transmitted while being included in the direct-current signal or the low-band signal, the band of the high-band signal for transmitting the communication information can be prevented from being compressed by the management information. Thus, it is possible to prevent occurrence of delay and dropping of the communication information due to transmission of the management information being included in the high-band signal. Accordingly, transmission of the communication information in the on-vehicle network can be efficiently performed.

In the on-vehicle communication apparatus according to the first embodiment of the present disclosure, the differential signal line includes the signal lines 10A and 10B. The direct-current signal is transmitted via one of the signal lines 10A and 10B.

Due to this configuration, between on-vehicle communication apparatuses, transmission of information using a direct-current signal or a low-band signal can be performed bidirectionally and simultaneously. Thus, the amount of information that can be transmitted per unit time by using the direct-current signal or the low-band signal can be increased.

In the on-vehicle communication apparatus according to the first embodiment of the present disclosure, the management information includes the communication quality between the on-vehicle communication apparatus and another on-vehicle communication apparatus.

Due to this configuration, for example, the on-vehicle communication apparatus as the transmission source of communication information can recognize the reception quality of the communication information in the on-vehicle communication apparatus as the transmission destination on the basis of the management information from the on-vehicle communication apparatus as the transmission destination, and thus can perform processing in accordance with the recognized reception quality. Accordingly, communication between on-vehicle communication apparatuses can be stabilized.

In the on-vehicle communication apparatus according to the first embodiment of the present disclosure, a direct-current signal having a level corresponding to the communication quality, or a low-band signal having an amplitude corresponding to the communication quality is transmitted via the differential signal line.

Due to this configuration, transmission via one differential signal line of the management information including the communication quality can be performed in a simple manner.

In the on-vehicle communication apparatus according to the first embodiment of the present disclosure, the direct-current signal or the low-band signal includes management information indicating the state regarding the physical layer between the on-vehicle communication apparatus and another on-vehicle communication apparatus. The communication information is information that does not include the management information. The management information includes the communication quality between the on-vehicle communication apparatus and the other on-vehicle communication apparatus. The adjustment unit 36 adjusts the operation of the amplifier included in the high-band communication unit 41 in accordance with the communication quality acquired by the low-band communication unit 42.

Due to this configuration, for example, the on-vehicle communication apparatus as the transmission source of communication information can recognize the reception quality of the communication information in the on-vehicle communication apparatus as the transmission destination on the basis of the management information from the on-vehicle communication apparatus as the transmission destination. Thus, the amplification factor of the high-band signal including the communication information can be appropriately adjusted in accordance with the recognized reception quality. Accordingly, communication between on-vehicle communication apparatuses can be stabilized and power consumption can be appropriately managed.

In the on-vehicle communication apparatus according to the first embodiment of the present disclosure, the carrier frequency of the high-band signal is 10 mega-hertz or higher.

Due to this configuration, separation from the direct-current signal and the low-band signal can be performed in a preferable manner. Thus, in the on-vehicle network, communication information can be transmitted at a high speed by using the high-band signal while communication in the on-vehicle network is stabilized.

In the on-vehicle communication apparatus according to the first embodiment of the present disclosure, the carrier frequency of the low-band signal is less than 1 mega-hertz.

Due to this configuration, separation from the high-band signal can be performed in a preferable manner. Thus, communication in the on-vehicle network can be stabilized.

In the on-vehicle communication apparatus according to the first embodiment of the present disclosure, the communication information is an Ethernet frame according to IEEE 802.3.

Due to this configuration, information can be efficiently transmitted with a simple configuration, in the on-vehicle network in which an Ethernet frame according to IEEE 802.3 is transmitted.

In the on-vehicle communication system according to the first embodiment of the present disclosure, a first on-vehicle communication apparatus and a second on-vehicle communication apparatus communicate with each other by using one differential signal line. The high-band communication unit 41 of the first on-vehicle communication apparatus generates a high-band signal including communication information and outputs the communication information to the differential signal line. The low-band communication unit 42 of the first on-vehicle communication apparatus generates a direct-current signal or a low-band signal and outputs the direct-current signal or the low-band signal to the differential signal line. The separation unit 43 of the second on-vehicle communication apparatus can separate a high-band signal, and a direct-current signal or a low-band signal from a signal received via the differential signal line. The high-band communication unit 41 of the second on-vehicle communication apparatus acquires information from the high-band signal separated by the separation unit 43. The low-band communication unit 42 of the second on-vehicle communication apparatus acquires information from the direct-current signal or the low-band signal separated by the separation unit 43.

Thus, due to the configuration in which the first on-vehicle communication apparatus and the second on-vehicle communication apparatus are connected to each other by one differential signal line, increase in the weight of the vehicle 1 can be suppressed. In addition, since the number of signal lines can be reduced, wiring of the signal lines can be facilitated. Since the high-band signal, and the direct-current signal or the low-band signal can be transmitted by using one differential signal line, the band in which information can be transmitted in one differential signal line can be expanded. Accordingly, the amount of information that can be transmitted per unit time by using one differential signal line can be increased. Therefore, in the on-vehicle network, information can be efficiently transmitted with a simple configuration.

In the on-vehicle communication system according to the first embodiment of the present disclosure, the high-band communication unit 41 of the second on-vehicle communication apparatus generates a high-band signal including communication information and outputs the high-band signal to the differential signal line. The low-band communication unit 42 of the second on-vehicle communication apparatus generates a direct-current signal or a low-band signal and outputs the direct-current signal or the low-band signal to the differential signal line. The separation unit 43 of the first on-vehicle communication apparatus can separate a high-band signal, and the direct-current signal or a low-band signal from a signal received via the differential signal line. The high-band communication unit 41 of the first on-vehicle communication apparatus acquires information from the high-band signal separated by the separation unit 43. The low-band communication unit 42 of the first on-vehicle communication apparatus acquires information from the direct-current signal or the low-band signal separated by the separation unit 43. The differential signal line includes the signal lines 10A and 10B. The low-band communication unit 42 of the first on-vehicle communication apparatus outputs a direct-current signal to one of the signal lines 10A and 10B. The low-band communication unit 42 of the second on-vehicle communication apparatus outputs a direct-current signal to the other of the signal lines 10A and 10B.

Due to this configuration, between the first on-vehicle communication apparatus and the second on-vehicle communication apparatus, transmission of information using a direct-current signal or a low-band signal can be performed bidirectionally and simultaneously. Thus, the amount of information that can be transmitted per unit time by using the direct-current signal or the low-band signal can be increased.

Next, another embodiment of the present disclosure is described with reference the drawings. In the drawings, the same or corresponding parts are denoted by the same reference characters, and description thereof is not repeated.

Second Embodiment

The present embodiment relates to an on-vehicle communication apparatus, compared with the on-vehicle communication apparatus according to the first embodiment, that can diagnose a failure of another on-vehicle communication apparatus opposed thereto via a differential signal line (hereinafter, also referred to as an opposed apparatus). Except for the content described below, the configuration is the same as that of the on-vehicle communication apparatus according to the first embodiment.

Figure 15:
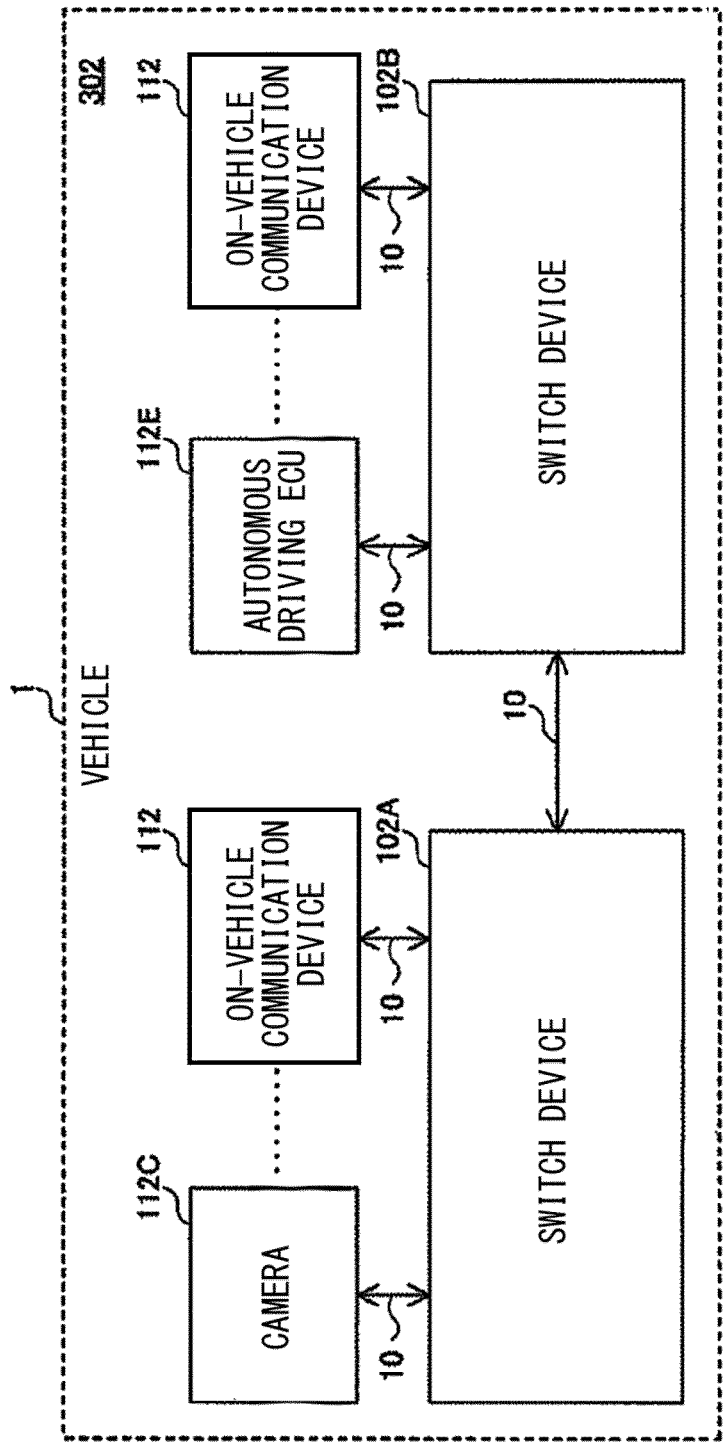
FIG. 15 shows an application example of an on-vehicle communication system according to a second embodiment of the present invention.

FIG. 15 shows an application example of an on-vehicle communication system according to a second embodiment of the present disclosure.

With reference to FIG. 15, an on-vehicle communication system 302 includes switch devices 102A, 102B and a plurality of on-vehicle communication devices 112. Hereinafter, each of the switch devices 102A, 102B is also referred to as a switch device 102.

A camera 112C, which is an on-vehicle communication device 112, is connected to the switch device 102A. An autonomous driving ECU 112E, which is an on-vehicle communication device 112, is connected to the switch device 102B.

Operations of the on-vehicle communication device 112 and the switch device 102 in the on-vehicle communication system 302 are the same as those of the on-vehicle communication device 111 and the switch device 101 in the on-vehicle communication system 301 shown in FIG. 2.

In the on-vehicle communication system 302, for example, the camera 112C transmits an Ethernet frame that includes image information to the autonomous driving ECU 112E via the switch devices 102A, 102B every predetermined time T1.

Every time the autonomous driving ECU 112E receives an Ethernet frame that includes image information from the camera 112C, the autonomous driving ECU 112E transmits an Ethernet frame including an ACK to the camera 112C via the switch devices 102B, 102A.

[Configuration of Camera 112C]

Figure 16:
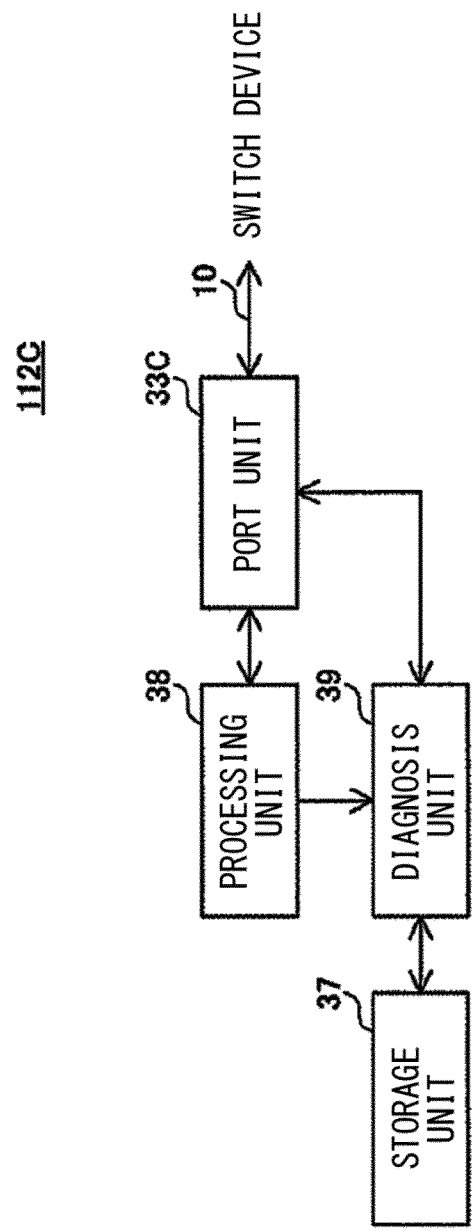
FIG. 16 shows a configuration of an on-vehicle communication device in the on-vehicle communication system according to the second embodiment of the present invention.

FIG. 16 shows a configuration of an on-vehicle communication device in the on-vehicle communication system according to the second embodiment of the present disclosure.

With reference to FIG. 16, the camera 112C includes a port unit 33C, a storage unit 37, a processing unit 38, and a diagnosis unit (second transmission processing unit and second reception processing unit) 39.

Operations of the port unit 33C, the storage unit 37, and the processing unit 38 in the camera 112C are the same as those of the port unit 33, the storage unit 37, and the processing unit 38 in the on-vehicle communication device 111 shown in FIG. 3.

As described above, the port unit 33C is connected to the switch device 102A via an Ethernet cable 10.

Here, the configuration and operation of the camera 112C are described as examples. However, the configurations and operations of on-vehicle communication devices 112 such as a TCU, a central gateway, a human machine interface, a sensor, the autonomous driving ECU 112E, and a navigation device are the same as those of the camera 112C.

[Configuration of Switch Device 102A]

Figure 17:
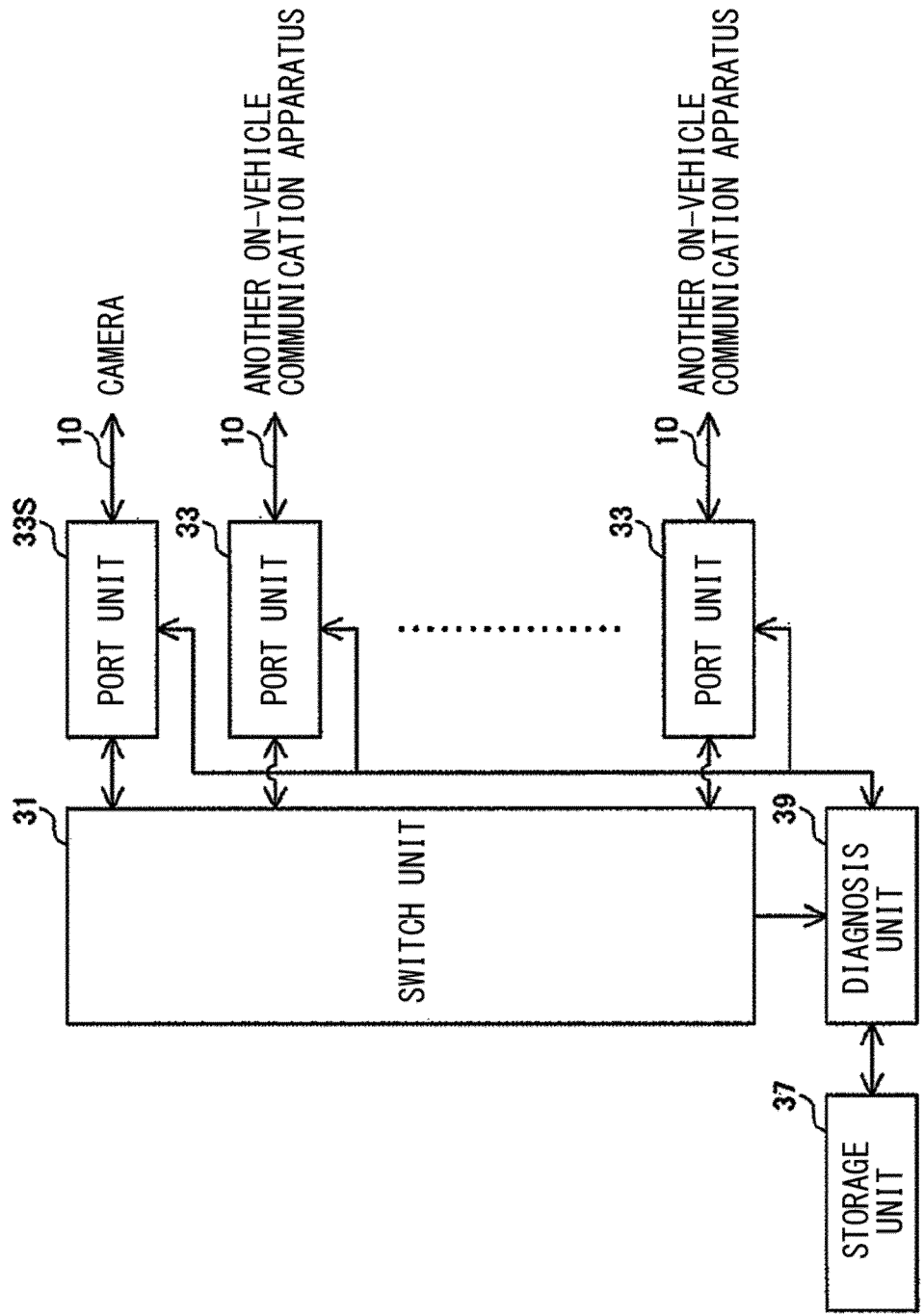
FIG. 17 shows a configuration of a switch device in the on-vehicle communication system according to the second embodiment of the present invention.

FIG. 17 shows a configuration of a switch device in the on-vehicle communication system according to the second embodiment of the present disclosure.

With reference to FIG. 17, the switch device 102A includes a switch unit 31, a plurality of port units 33, a storage unit 37, and a diagnosis unit 39.

Operations of the switch unit 31, the port units 33, and the storage unit 37 in the switch device 102A are the same as those of the switch unit 31, the port units 33, and the storage unit 37 in the switch device 101 shown in FIG. 8.

As described above, the port unit 33S is connected to the camera 112C via an Ethernet cable 10.

Here, the configuration and operation of the switch device 102A are described as examples, but the configuration and operation of the switch device 102B are the same as those of the switch device 102A.

The storage unit 37 has registered therein an Ethernet frame that is periodically transmitted (hereinafter, also periodical transmission frame), for example. Specifically, as one example of the periodical transmission frame, the storage unit 37 in the switch device 102A has registered therein a periodical transmission frame FC that is transmitted every predetermined time T1 from the camera 112C to the autonomous driving ECU 112E via the switch device 102A.

For example, the diagnosis unit 39 monitors Ethernet frames transferred by the switch unit 31, and, on the basis of the content registered in the storage unit 37, the diagnosis unit 39 detects that the periodical transmission frame FC is not received periodically.

More specifically, the diagnosis unit 39 measures an elapsed time from the latest reception timing of the periodical transmission frame FC, for example, and if a new periodical transmission frame FC cannot be received even after a lapse of a timeout period from the latest reception timing, the diagnosis unit 39 diagnoses the opposed apparatus of the switch device 102A, i.e., the camera 112C, for example. Here, the timeout period is a time period longer than the predetermined time T1.

FIG. 18 shows one example of a correspondence table held by the on-vehicle communication device and the switch device according to the second embodiment of the present disclosure.

With reference to FIG. 18, a correspondence table Tab3 indicates the correspondence relationship between the level range of direct-current signal and the content of management information. The correspondence table Tab3 is stored in the storage unit 37, for example.

With reference to FIG. 17 again, in order to confirm whether or not the camera 112C has failed, the diagnosis unit 39 in the switch device 102A refers to the correspondence table Tab3 held by the storage unit 37, and specifies 9.0 V to 10.0 V as the level range of the direct-current signal corresponding to a failure confirmation request in the correspondence table Tab3. Here, the failure confirmation request is one example of failure diagnosis information.

Then, the diagnosis unit 39 outputs to the port unit 33S a transmission command for a direct-current signal of 9.5 V, which is an intermediate voltage between 9.0 V and 10.0 V, for example.

With reference to FIG. 9 again, the low-band communication unit 42 in the port unit 33S generates a direct-current signal that includes management information including the failure confirmation request, and outputs the direct-current signal to the differential signal line, for example.

Specifically, upon receiving the transmission command from the diagnosis unit 39, the low-band communication unit 42 generates a direct-current signal in accordance with the received transmission command by using the DA converter.

The low-band communication unit 42 outputs, by using the hybrid circuit, the generated direct-current signal to the signal line 10B via the low-pass filter 45.

With reference to FIG. 4 again, the low-band communication unit 42 in the port unit 33C of the camera 112C receives the failure confirmation request from the switch device 102A and outputs a direct-current signal that includes predetermined information to the differential signal line, for example. Here, the predetermined information is a failure confirmation response, for example.

More specifically, the low-band communication unit 42 acquires the direct-current signal that has been transmitted from the switch device 102A via the signal line 10B and that has passed through the low-pass filter 45, i.e., a direct-current reception signal.

The low-band communication unit 42 detects the level of the acquired direct-current reception signal by using the AD converter, and outputs level information indicating the detected level, to the diagnosis unit 39.

With reference to FIG. 16 again, upon receiving the level information from the low-band communication unit 42, the diagnosis unit 39 in the camera 112C refers to the correspondence table Tab3 (see FIG. 18) held by the storage unit 37, and specifies a level range that includes the level indicated by the received level information.

Here, since the level indicated by the level information is 9.5 V, the diagnosis unit 39 specifies 9.0 V to 10.0 V as the level range that includes the level, for example.

The diagnosis unit 39 confirms the failure confirmation request corresponding to the specified level range, and determines that a failure confirmation response should be transmitted to the switch device 102A.

Then, the diagnosis unit 39 refers to the correspondence table Tab3 held by the storage unit 37, and specifies 10.0 V to 11.0 V as the level range of the direct-current signal corresponding to the failure confirmation response in the correspondence table Tab3.

The diagnosis unit 39 outputs to the port unit 33C a transmission command for a direct-current signal of 10.5 V, which is an intermediate voltage between 10.0 V and 11.0 V, for example.

With reference to FIG. 4 again, upon receiving the transmission command from the diagnosis unit 39, the low-band communication unit 42 in the port unit 33C generates a direct-current signal in accordance with the received transmission command by using the DA converter, for example.

The low-band communication unit 42 outputs, by using the hybrid circuit, the generated direct-current signal to the signal line 10A via the low-pass filter 45.

With reference to FIG. 9 again, the low-band communication unit 42 in the port unit 33S of the switch device 102A acquires, by using the hybrid circuit, the direct-current signal that has been transmitted from the camera 112C via the signal line 10A and that has passed through the low-pass filter 45, i.e., a direct-current reception signal.

The low-band communication unit 42 detects the level of the acquired direct-current reception signal by using the AD converter, and outputs level information indicating the detected level, to the diagnosis unit 39.

With reference to FIG. 17 again, the diagnosis unit 39 of the switch device 102A diagnoses a failure of the camera 112C on the basis of the reception condition of the failure confirmation response from the camera 112C, for example.

More specifically, upon receiving the level information form the low-band communication unit 42, the diagnosis unit 39 refers to the correspondence table Tab3 (see FIG. 18) held by the storage unit 37, and specifies a level range that includes the level indicated by the received level information.

Here, since the level indicated by the level information is 10.5 V, the diagnosis unit 39 specifies 10.0 V to 11.0 V as the level range that includes the level, for example.

The diagnosis unit 39 confirms the failure confirmation response corresponding to the specified level range, and recognizes that the diagnosis unit 39 in the camera 112C is functioning normally.

Then, the diagnosis unit 39 determines that there is a high possibility that the cause for the periodical transmission frame FC not being periodically received is a failure of the high-band communication unit 41 in the camera 112C, and stores failure determination information indicating the determination result into the storage unit 37.

Meanwhile, for example, when the diagnosis unit 39 in the camera 112C is not functioning normally, the diagnosis unit 39 in the switch device 102A does not receive a failure confirmation response from the camera 112C.

In this case, the diagnosis unit 39 in the switch device 102A determines that there is a high possibility that the cause for the periodical transmission frame FC not being periodically received is a failure of either one of the diagnosis unit 39 and the low-band communication unit 42 in the camera 112C, and stores failure determination information indicating the determination result into the storage unit 37.

The failure determination information stored in the storage unit 37 can be transmitted to a maintenance terminal device in accordance with a communication standard such as OBD 2 (On Board Diagnosis second generation), for example.

The failure determination information transmitted to the maintenance terminal device can be used for specifying the failure part, for example. Accordingly, repair of the vehicle 1 at a maintenance factory can be facilitated.

Here, a case where the switch device 102A transmits a failure confirmation request to the camera 112C and the camera 112C transmits a failure confirmation response to the switch device 102A has been described. However, similar operations are performed also in a case where the camera 112C transmits a failure confirmation request to the switch device 102A, and the switch device 102A transmits a failure confirmation response to the camera 112C.

More specifically, the diagnosis unit 39 in the camera 112C diagnoses an opposed apparatus on the basis of the fact that a periodical transmission frame including an ACK is not periodically received, for example.

[Modification]

The diagnosis unit 39 in each of the camera 112C and the switch device 102A is configured to diagnose an opposed apparatus on the basis of the reception condition of the periodical transmission frame. However, the present disclosure is not limited thereto.

The diagnosis unit 39 in each of the camera 112C and the switch device 102A may periodically transmit a failure confirmation request and diagnose the opposed apparatus on the basis of a periodical reception condition of a failure confirmation response, for example. Specifically, when the diagnosis unit 39 cannot receive a failure confirmation response from the opposed apparatus for a predetermined time, the diagnosis unit 39 determines a failure of the opposed apparatus.

More specifically, when a diagnosis timing in each predetermined diagnosis period arrives, the diagnosis unit 39 in the switch device 102A causes the low-band communication unit 42 in the port unit 33S to transmit a direct-current signal having a level corresponding to a failure confirmation request, for example.

When the low-band communication unit 42 in the port unit 33C has received the direct-current signal having the level corresponding to the failure confirmation request, the diagnosis unit 39 in the camera 112C causes the low-band communication unit 42 in the port unit 33C to transmit a direct-current signal having a level corresponding to a failure confirmation response.

When the low-band communication unit 42 in the port unit 33S has received the direct-current signal having the level corresponding to the failure confirmation response, the diagnosis unit 39 in the switch device 102A recognizes that the diagnosis unit 39 and the low-band communication unit 42 in the camera 112C are functioning normally.

Meanwhile, when at least one of the diagnosis unit 39 and the low-band communication unit 42 in the camera 112C is not functioning normally, the diagnosis unit 39 in the switch device 102A does not receive a failure confirmation response from the camera 112C.

When the diagnosis unit 39 in the switch device 102A cannot receive a failure confirmation response from the camera 112C for a predetermined time, the diagnosis unit 39 in the switch device 102A determines that there is a high possibility that at least one of the diagnosis unit 39 and the low-band communication unit 42 in the camera 112C has failed, and stores failure determination information indicating the determination result into the storage unit 37.

Here, a configuration in which the diagnosis unit 39 in the switch device 102A transmits a failure confirmation request to the camera 112C every predetermined diagnosis period has been described. However, similar operations are performed also in a configuration in which the diagnosis unit 39 in the camera 112C transmits a failure confirmation request to the switch device 102A every predetermined diagnosis period.

Transmission/reception of the failure confirmation request and the failure confirmation response between an on-vehicle communication device 112 and a switch device 102 has been described in detail, using the transmission/reception between the camera 112C and the switch device 102A as an example. However, transmission/reception of the failure confirmation request and the failure confirmation response between two switch devices 102 is similar to the transmission/reception between an on-vehicle communication device 112 and a switch device 102.

Figure 19:
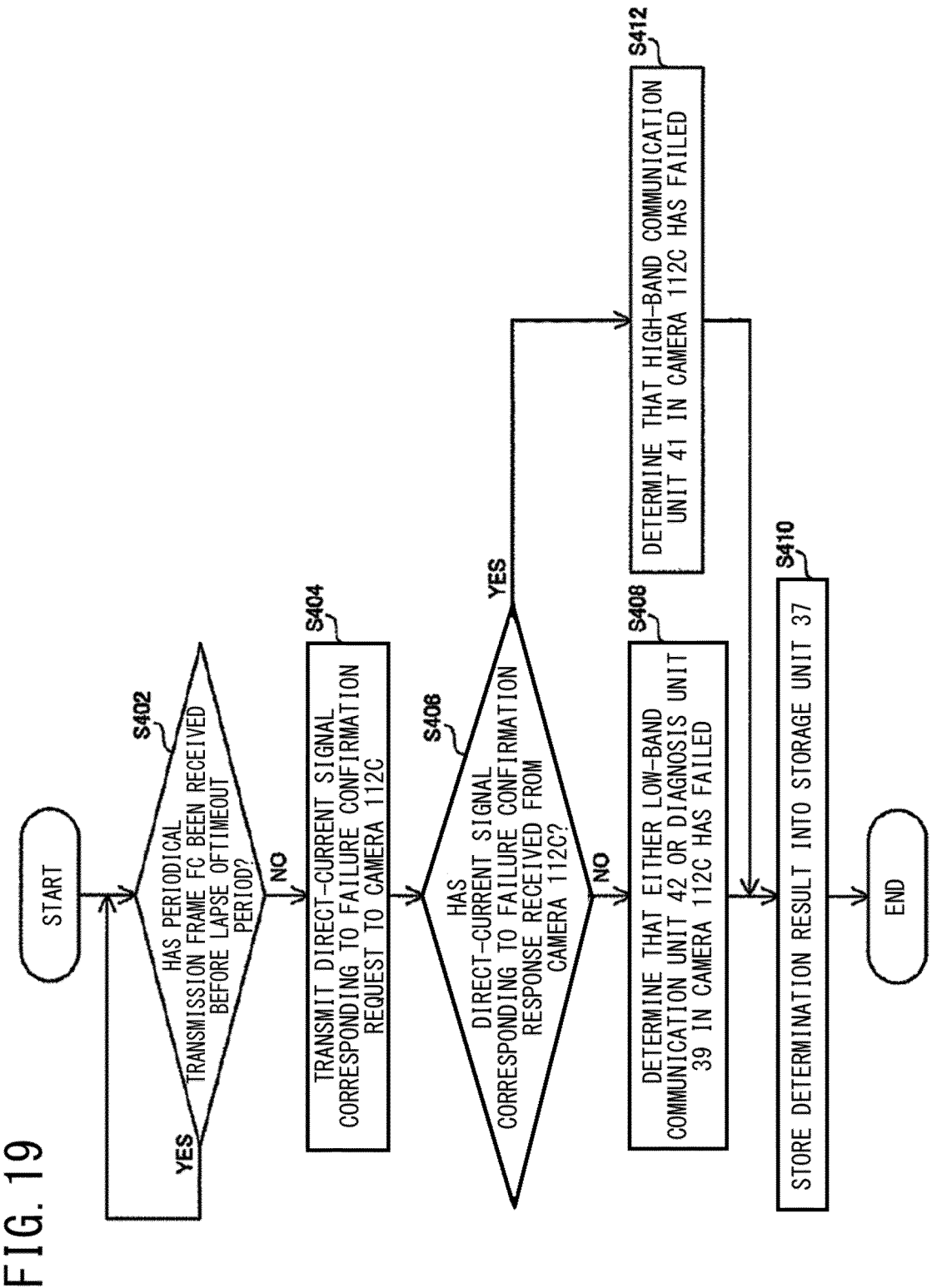
FIG. 19 is a flow chart of an operation procedure in a case where a switch device transmits a failure confirmation request to a camera in the on-vehicle communication system according to the second embodiment of the present invention.

FIG. 19 is a flow chart of an operation procedure in a case where a switch device transmits a failure confirmation request to a camera in the on-vehicle communication system according to the second embodiment of the present disclosure.

With reference to FIG. 19, a condition in which the switch device 102A periodically receives the periodical transmission frame FC from the camera 112C is assumed.

First, when the switch device 102A has been able to receive a new periodical transmission frame FC from the camera 112C before a lapse of a timeout period from the latest reception timing of the periodical transmission frame FC, the switch device 102A waits (YES in step S402).

When the switch device 102A has not been able to receive a new periodical transmission frame FC from the camera 112C before a lapse of the timeout period from the latest reception timing of the periodical transmission frame FC (NO in step S402), the switch device 102A transmits a direct-current signal corresponding to a failure confirmation request to the camera 112C via the low-band communication unit 42 (step S404).

Next, when the switch device 102A cannot receive a direct-current signal corresponding to a failure confirmation response from the camera 112C via the low-band communication unit 42 (NO in step S406), the switch device 102A determines that there is a high possibility that either one of the low-band communication unit 42 and the diagnosis unit 39 in the camera 112C has failed (step S408).

Meanwhile, when the switch device 102A has been able to receive a direct-current signal corresponding to a failure confirmation response from the camera 112C via the low-band communication unit 42 (YES in step S406), the switch device 102A determines that there is a high possibility that the high-band communication unit 41 in the camera 112C has failed (step S412).

Next, the switch device 102A stores failure determination information indicating the determination result into the storage unit 37 (step S410).

In the operation flow above, an example configuration in which the switch device 102A diagnoses a failure of the camera 112C as the opposed apparatus has been described. However, the present disclosure is not limited thereto. The switch device 102A may diagnose a failure of the switch device 102B as the opposed apparatus.

Figure 20:
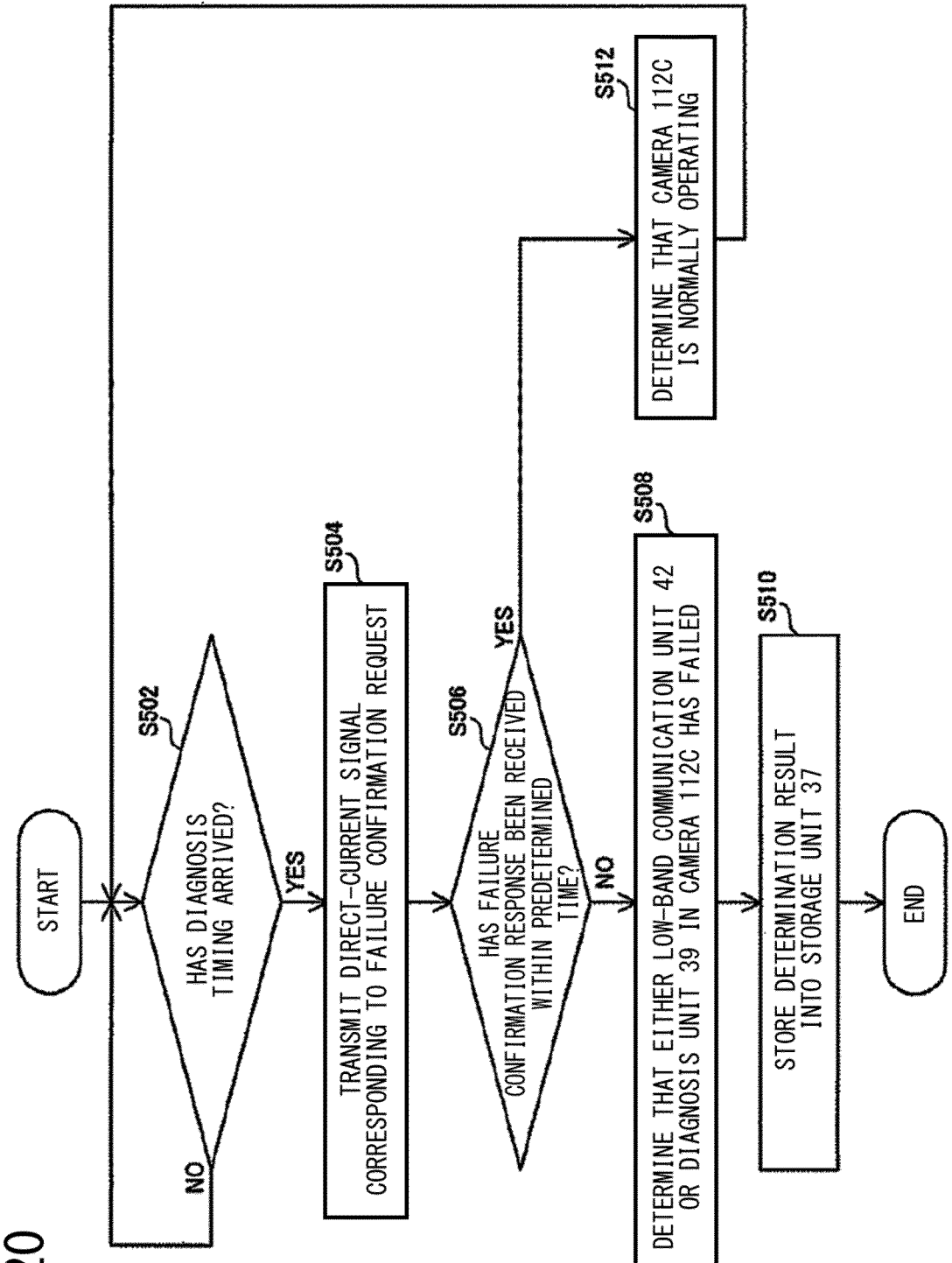
FIG. 20 is a flow chart of an operation procedure in a case where a switch device periodically transmits a failure confirmation request to a camera in the on-vehicle communication system according to the second embodiment of the present invention.

FIG. 20 is a flow chart of an operation procedure in a case where a switch device periodically transmits a failure confirmation request to a camera in the on-vehicle communication system according to the second embodiment of the present disclosure.

With reference to FIG. 20, first, the switch device 102A waits until a diagnosis timing in each predetermined diagnosis period arrives (NO in step S502).

When the diagnosis timing has arrived (YES in step S502), the switch device 102A transmits a direct-current signal corresponding to a failure confirmation request to the camera 112C via the low-band communication unit 42 (step S504).

Next, when the switch device 102A has been able to receive a direct-current signal corresponding to a failure confirmation response from the camera 112C via the low-band communication unit 42 within a predetermined time (YES in step S506), the switch device 102A determines that the camera 112C is operating normally (step S512).

Next, the switch device 102A waits until a new diagnosis timing arrives (NO in step S502).

Meanwhile, when the switch device 102A cannot receive a direct-current signal corresponding to a failure confirmation response from the camera 112C via the low-band communication unit 42 within the predetermined time (NO in step S506), the switch device 102A determines that there is a high possibility that either one of the low-band communication unit 42 and the diagnosis unit 39 in the camera 112C has failed (step S508).

Next, the switch device 102A stores failure determination information indicating the determination result into the storage unit 37 (step S510).

In the on-vehicle communication system according to the second embodiment of the present disclosure, the failure confirmation request and the failure confirmation response are each configured to be included in the direct-current signal. However, the present disclosure is not limited thereto. The failure confirmation request and the failure confirmation response may each be configured to be included in the low-band signal.

As described above, in the on-vehicle communication apparatus according to the second embodiment of the present disclosure, the management information includes the failure diagnosis information.

Due to this configuration, the failure diagnosis information, e.g., the failure confirmation request, can be transmitted by using the direct-current signal or the low-band signal. Thus, a failure in another on-vehicle communication apparatus can be diagnosed without compressing the band of the high-band signal.

In the on-vehicle communication system according to the second embodiment of the present disclosure, the direct-current signal or the low-band signal includes management information indicating the state regarding the physical layer between the on-vehicle communication apparatus and another on-vehicle communication apparatus. The communication information is information that does not include the management information. The management information includes a failure confirmation request. The low-band communication unit 42 of the second on-vehicle communication apparatus receives a failure confirmation request from the first on-vehicle communication apparatus and outputs a direct-current signal or a low-band signal that includes a failure confirmation response, to the differential signal line. The diagnosis unit 39 in the first on-vehicle communication apparatus diagnoses a failure of the second on-vehicle communication apparatus on the basis of the reception condition of the failure confirmation response from the second on-vehicle communication apparatus.

Due to this configuration, since the failure confirmation request and the failure confirmation response can be transmitted by using the direct-current signal or the low-band signal, a failure in the second on-vehicle communication apparatus can be diagnosed without compressing the band of the high-band signal. When the first on-vehicle communication apparatus can receive a failure confirmation response from the second on-vehicle communication apparatus, the first on-vehicle communication apparatus can recognize that the low-band communication unit 42 and the processing unit processing the failure confirmation request and the failure confirmation response in the second on-vehicle communication apparatus are operating, for example. When the first on-vehicle communication apparatus cannot receive a failure confirmation response from the second on-vehicle communication apparatus, the first on-vehicle communication apparatus can determine that there is a high possibility that at least one of the processing unit and the low-band communication unit 42 in the second on-vehicle communication apparatus has failed, for example.

In the on-vehicle communication system according to the second embodiment of the present disclosure, communication information is periodically transmitted from the second on-vehicle communication apparatus to the first on-vehicle communication apparatus. When the high-band communication unit 41 of the first on-vehicle communication apparatus cannot receive a high-band signal including communication information from the second on-vehicle communication apparatus for a predetermined time, the first on-vehicle communication apparatus outputs a direct-current signal or a low-band signal that includes a failure confirmation request to the differential signal line.

Due to this configuration, when the first on-vehicle communication apparatus can receive a failure confirmation response from the second on-vehicle communication apparatus, the first on-vehicle communication apparatus can recognize that the above processing unit is operating. Thus, the first on-vehicle communication apparatus can determine that there is a high possibility that the cause for being unable to receive the communication information is a failure of the high-band communication unit 41 in the second on-vehicle communication apparatus. In addition, since the failure diagnosis information can be transmitted to the second on-vehicle communication apparatus in a condition where there is a high possibility that the second on-vehicle communication apparatus has failed, it is possible to prevent unnecessary transmission of the failure diagnosis information in a condition where the possibility that the second on-vehicle communication apparatus has failed is low.

In the on-vehicle communication system according to the second embodiment of the present disclosure, the first on-vehicle communication apparatus periodically outputs a direct-current signal or a low-band signal that includes a failure confirmation request to the differential signal line. When a failure confirmation response cannot be received from the second on-vehicle communication apparatus for a predetermined time, the diagnosis unit 39 in the first on-vehicle communication apparatus determines a failure in the second on-vehicle communication apparatus.

Due to this configuration, the first on-vehicle communication apparatus can periodically determine the presence or absence of a failure in the second on-vehicle communication apparatus. Thus, a failure in the second on-vehicle communication apparatus can be found early.

The other configurations and operations are the same as those of the on-vehicle communication apparatus according to the first embodiment, and thus, detailed description thereof is not repeated.

Next, another embodiment of the present disclosure is described with reference to the drawings. In the drawings, the same or corresponding parts are denoted by the same reference characters, and description thereof is not repeated.

Third Embodiment

The present embodiment relates to an on-vehicle communication system that can change a communication path, compared with the on-vehicle communication system according to the first embodiment. Except for the content described below, the configuration is the same as that of the on-vehicle communication system according to the first embodiment.

Figure 21:
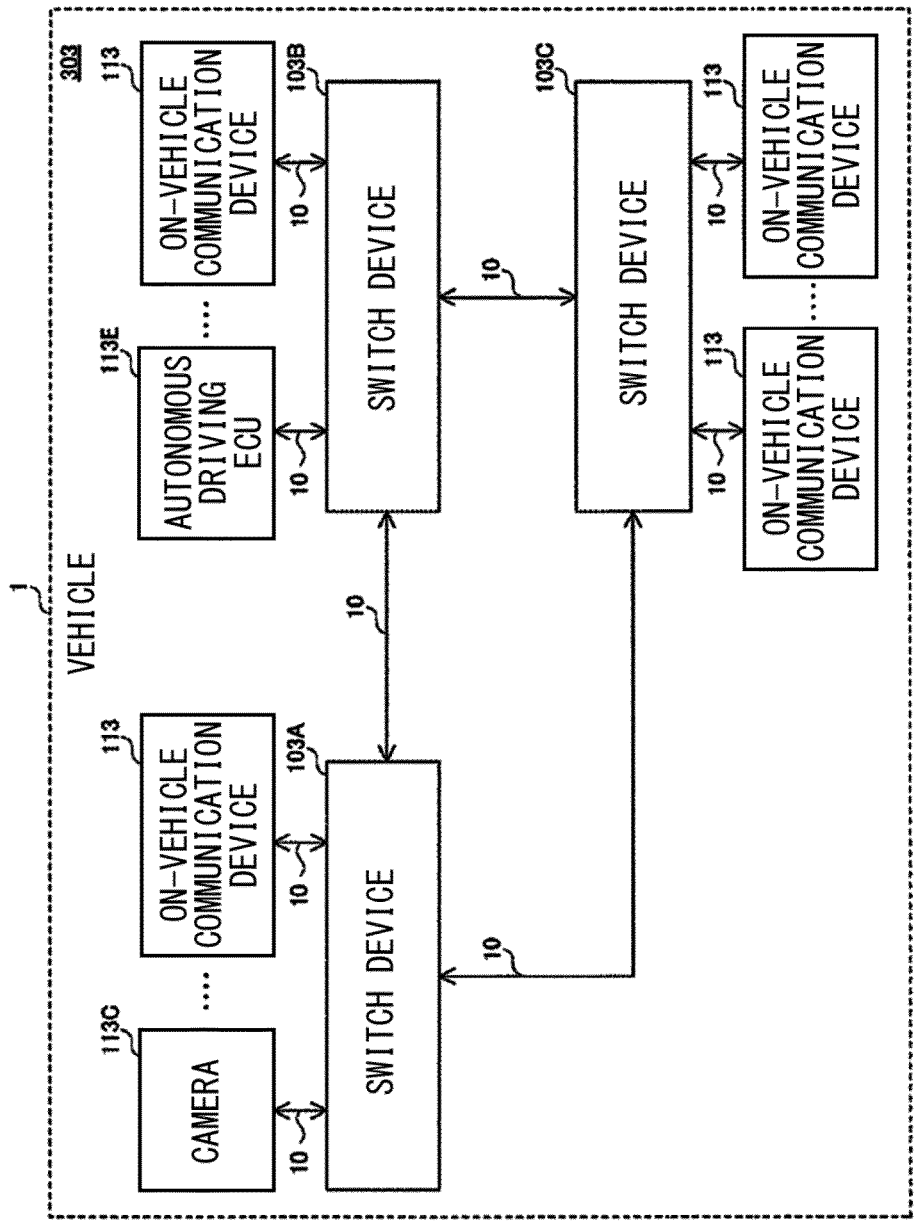
FIG. 21 shows an application example of an on-vehicle communication system according to a third embodiment of the present invention.

FIG. 21 shows an application example of an on-vehicle communication system according to a third embodiment of the present disclosure.

With reference to FIG. 21, an on-vehicle communication system 303 includes switch devices 103A, 103B, 103C, and a plurality of on-vehicle communication devices 113. Hereinafter, each of the switch devices 103A, 103B, 103C is also referred to as a switch device 103.

A camera 113C, which is an on-vehicle communication device 113, is connected to the switch device 103A. An autonomous driving ECU 113E, which is an on-vehicle communication device 113, is connected to the switch device 103B.

Operations of the on-vehicle communication device 113 and the switch device 103 in the on-vehicle communication system 303 are the same as those of the vehicle communication device 111 and the switch device 101 in the on-vehicle communication system 301 shown in FIG. 2.

The on-vehicle network in the vehicle 1 has a ring network topology formed by three switch devices 103, i.e., the switch devices 103A to 103C, for example. In the on-vehicle network, the mutual connection relationship among the switch devices 103A to 103C and the connection relationship between each switch device 103 and on-vehicle communication devices 113 are fixed, for example.

[Configuration of Switch Device 103A]

Figure 22:
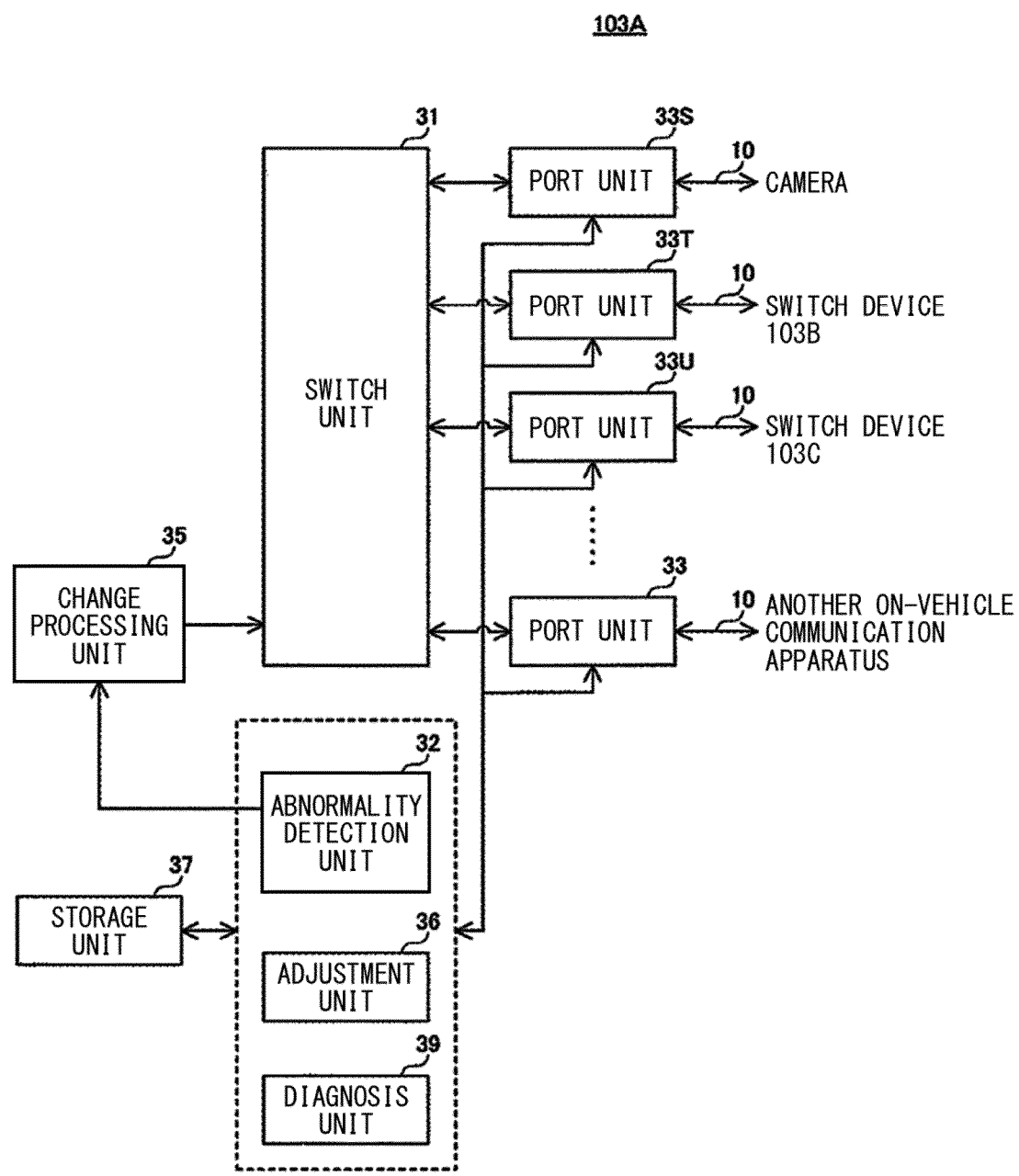
FIG. 22 shows a configuration of a switch device in the on-vehicle communication system according to the third embodiment of the present invention.

FIG. 22 shows a configuration of a switch device in the on-vehicle communication system according to the third embodiment of the present disclosure.

With reference to FIG. 22, the switch device 103A includes a switch unit 31, an abnormality detection unit 32, a plurality of port units 33, a change processing unit 35, an adjustment unit 36, a storage unit 37, and a diagnosis unit 39.

Operations of the switch unit 31, the port units 33, the adjustment unit 36, and the storage unit 37 in the switch device 103A are the same as those of the switch unit 31, the port units 33, the adjustment unit 36, and the storage unit 37 in the switch device 101 shown in FIG. 8.

Operation of the diagnosis unit 39 in the switch device 103A is the same as that of the diagnosis unit 39 in the switch device 102 shown in FIG. 17.

In the switch device 103A, the port units 33S, 33T, and 33U, which are each a port unit 33, are connected to the camera 113C, the switch device 103B and the switch device 103C, respectively.

In this example, the switch unit 31 holds an ARL table which indicates the correspondence relationship between the MAC address of the autonomous driving ECU 113E as the destination MAC address and the port number of the port unit 33T as the output destination, and the correspondence relationship between the MAC address of the camera 113C as the destination MAC address and the port number of the port unit 33S as the output destination, for example.

When the switch unit 31 has received, via the port unit 33S, an Ethernet frame that includes the MAC address of the autonomous driving ECU 113E as the destination MAC address and that includes image information, the switch unit 31 transmits the received Ethernet frame to the switch device 103B via the port unit 33T on the basis of the ARL table, for example.

Meanwhile, when the switch unit 31 has received, via the port unit 33T, an Ethernet frame that includes the MAC address of the camera 113C as the destination MAC address and that includes an ACK, the switch unit 31 transmits the received Ethernet frame to the camera 113C via the port unit 33S on the basis of the ARL table.

FIG. 23 shows one example of a correspondence table held by the on-vehicle communication device and the switch device according to the third embodiment of the present disclosure.

With reference to FIG. 23, a correspondence table Tab4 indicates the correspondence relationship between the level range of direct-current signal and the content of management information. The correspondence table Tab4 is stored in the storage unit 37, for example.

FIG. 24 shows one example of a breakage determination table held by the on-vehicle communication device and the switch device according to the third embodiment of the present disclosure.

With reference to FIG. 24, a breakage determination table Tab5 indicates the correspondence relationship between the level range of direct-current signal and the determination content. The breakage determination table Tab5 is stored in the storage unit 37, for example.

With reference to FIG. 22 to FIG. 24, the abnormality detection unit 32 detects an abnormality when the level of the direct-current signal acquired by the low-band communication unit 42 is in a predetermined range, for example.

For example, when the Ethernet cable 10 is broken or is highly likely to be broken, the impedance of the Ethernet cable 10 increases. Thus, the level of the direct-current signal transmitted in the Ethernet cable 10 decreases.

By detecting the decreased level of the direct-current signal, the abnormality detection unit 32 detects that the Ethernet cable 10 is broken or is highly likely to be broken.

More specifically, the abnormality detection unit 32 monitors the level indicated by the level information outputted by the low-band communication unit 42 in each port unit 33 to the adjustment unit 36 and the diagnosis unit 39.

When a monitored level is included in the level range of the direct-current signal indicated in the breakage determination table Tab5, the abnormality detection unit 32 determines that the Ethernet cable 10 connected to a corresponding port unit 33 is broken or is highly likely to be broken.

Here, the level range of the direct-current signal indicated in the breakage determination table Tab5 does not overlap the range corresponding to the management information, specifically, the level range of the direct-current signal indicated in the correspondence table Tab4.

More specifically, the levels included in the level range of the direct-current signal indicated in the breakage determination table Tab5 are lower than the levels included in the level range of the direct-current signal indicated in the correspondence table Tab4.

Here, for example, the abnormality detection unit 32 detects that the level indicated by the level information from the low-band communication unit 42 in the port unit 33T is included in the level range of the direct-current signal indicated in the breakage determination table Tab5, and determines that the Ethernet cable 10 connected to the port unit 33T is broken or is highly likely to be broken. The abnormality detection unit 32 outputs breakage information indicating the determination result to the change processing unit 35.

For example, when the abnormality detection unit 32 has detected an abnormality, the change processing unit 35 performs a process regarding changing of the communication path between the switch device 103A and the switch device 103B.

More specifically, when the change processing unit 35 has received breakage information from the abnormality detection unit 32, the change processing unit 35 recognizes that the Ethernet cable 10 connected to the port unit 33T is broken or is highly likely to be broken, on the basis of the received breakage information.

Then, for example, by rewriting the ARL table held by the switch unit 31, the change processing unit 35 changes the communication path from the switch device 103A to the switch device 103B, to a communication path from the switch device 103A via the switch device 103C to the switch device 103B.

In this example, the switch unit 31 rewrites the correspondence relationship between the MAC address of the autonomous driving ECU 113E as the destination MAC address and the port number of the port unit 33T as the output destination, into a correspondence relationship between the MAC address of the autonomous driving ECU 113E as the destination MAC address and the port number of the port unit 33U as the output destination, for example.

Accordingly, the Ethernet frame having been transmitted from the camera 113C via the switch devices 103A, 103B to the autonomous driving ECU 113E (see FIG. 21) is transmitted from the camera 113C via the switch devices 103A, 103C, 103B to the autonomous driving ECU 113E. That is, the communication path is changed.

Here, the configuration and operation of the switch device 103A have been described. However, the configurations and operations of on-vehicle communication devices 113 such as the camera 113C and the autonomous driving ECU 113E, and of the switch devices 103B, 103C are similar to those of the switch device 103A.

Figure 25:
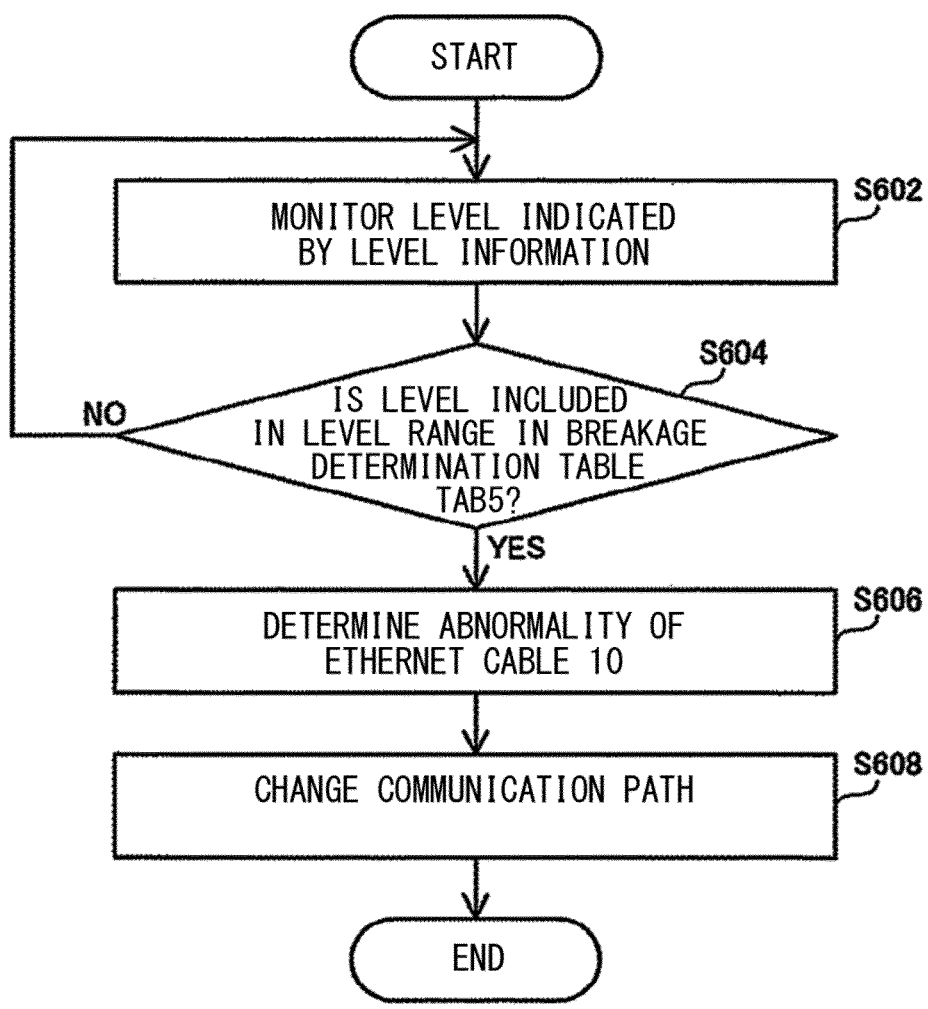
FIG. 25 is a flow chart of an operation procedure in a case where a switch device changes a communication path in the on-vehicle communication system according to the third embodiment of the present invention.

FIG. 25 is a flow chart of an operation procedure in a case where a switch device changes a communication path in the on-vehicle communication system according to the third embodiment of the present disclosure.

With reference FIG. 25, first, while the level of the direct-current signal indicated by level information is outside the level range of the direct-current signal in the breakage determination table Tab5 (NO in step S604), the switch device 103A monitors the level (step S602).

When the level of the direct-current signal indicated by the level information is included in the level range of the direct-current signal in the breakage determination table Tab5 (YES in step S604), the switch device 103A determines that the Ethernet cable 10 is broken or is highly likely to be broken (step S606).

Next, by rewriting the ARL table, the switch device 103A changes the communication path from the switch device 103A to the switch device 103B, to a communication path from the switch device 103A via the switch device 103C to the switch device 103B (step S608).

In the on-vehicle communication apparatus according to the third embodiment of the present disclosure, the abnormality detection unit 32 is configured to detect an abnormality when the level of the direct-current signal acquired by the low-band communication unit 42 is in a predetermined range. However, the present disclosure is not limited thereto. For example, in a case where a low-band signal is transmitted in the Ethernet cable 10, the abnormality detection unit 32 may be configured to detect an abnormality when the amplitude of the low-band signal acquired by the low-band communication unit 42 is in a predetermined range.

In the on-vehicle communication apparatus according to the third embodiment of the present disclosure, the level range of the direct-current signal indicated in the breakage determination table Tab5 is configured not to overlap the level range of the direct-current signal indicated in the correspondence table Tab4. However, the present disclosure is not limited thereto. The level range of the direct-current signal indicated in the breakage determination table Tab5 may partially overlap the level range of the direct-current signal indicated in the correspondence table Tab4. Accordingly, the abnormality detection unit 32 can determine an abnormality of the Ethernet cable 10 at an earlier timing in the decrease of the level of the direct-current signal.

The on-vehicle communication apparatus according to the third embodiment of the present disclosure is configured to include the change processing unit 35. However, the present disclosure is not limited thereto. For example, as in the case of the camera 113C and the autonomous driving ECU 113E, an on-vehicle communication apparatus that does not have a communication path that is to be changed may be configured not to include the change processing unit 35.

As described above, in the on-vehicle communication apparatus according to the third embodiment of the present disclosure, the abnormality detection unit 32 detects an abnormality when the level of the direct-current signal acquired by the low-band communication unit 42 is in a predetermined range, or when the amplitude of the low-band signal acquired by the low-band communication unit 42 is in a predetermined range.

For example, in a case where the differential signal line has a characteristic that the impedance increases when the differential signal line is degraded, if a configuration is employed in which an abnormality is detected when the level of the direct-current signal or the amplitude of the low-band signal decreases to be in a predetermined range, an abnormality in the differential signal line can be detected in a simple manner, as described above.

In the on-vehicle communication apparatus according to the third embodiment of the present disclosure, the direct-current signal or the low-band signal includes management information indicating the state regarding the physical layer between the on-vehicle communication apparatus and another on-vehicle communication apparatus. The communication information is information that does not include the management information. In addition, the predetermined range does not overlap the range corresponding to the management information.

When the differential signal line is degraded, there is a high possibility that the level of the direct-current signal or the amplitude of the low-band signal is not included in the range corresponding to the management information. As described above, due to the configuration in which the predetermined range does not overlap the range corresponding to the management information, the predetermined range can be set in a range that enables more reliable determination of an abnormality.

In the on-vehicle communication apparatus according to the third embodiment of the present disclosure, when the abnormality detection unit 32 has detected an abnormality, the change processing unit 35 performs a process regarding changing of the communication path between the on-vehicle communication apparatus and another on-vehicle communication apparatus.

Due to this configuration, a redundant configuration of the communication path between the on-vehicle communication apparatus and another on-vehicle communication apparatus can be realized. Thus, the communication information can be more reliably transmitted.

The other configurations and operations are the same as those of the on-vehicle communication apparatus according to the first embodiment, and thus, detailed description thereof is not repeated.

It should be noted that part or all of components and operations of apparatuses according to the first embodiment to the third embodiment of the present disclosure can be combined as appropriate.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

An on-vehicle communication apparatus configured to communicate with another on-vehicle communication apparatus by using one differential signal line, the on-vehicle communication apparatus comprising:

a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line, wherein the on-vehicle communication apparatus and the other on-vehicle communication apparatus are installed in the same vehicle, the differential signal line is a UTP (Unshielded Twisted Pair) cable, and the on-vehicle communication apparatus is a switch device, a TCU (Telematics Communication Unit), a central gateway, a human machine interface, a camera, a sensor, an autonomous driving ECU (Electronic Control Unit), or a navigation device.

[Additional Note 2]

An on-vehicle communication apparatus configured to communicate with another on-vehicle communication apparatus by using one differential signal line, the on-vehicle communication apparatus comprising:

a separation unit capable of separating a high-band signal, and a direct-current signal or a low-band signal, from a signal received via the differential signal line;

a high-band communication unit configured to acquire information from the high-band signal separated by the separation unit; and a low-band communication unit configured to acquire information from the direct-current signal or the low-band signal separated by the separation unit, wherein the on-vehicle communication apparatus and the other on-vehicle communication apparatus are installed in the same vehicle, the differential signal line is a UTP cable, the on-vehicle communication apparatus is a switch device, a TCU, a central gateway, a human machine interface, a camera, a sensor, an autonomous driving ECU, or a navigation device, and the separation unit includes a low-pass filter configured to attenuate the high-band signal from the signal received via the differential signal line, and a high-pass filter configured to attenuate the direct-current signal or the low-band signal from the signal.

[Additional Note 3]

An on-vehicle communication system comprising:

a first on-vehicle communication apparatus and a second on-vehicle communication apparatus which are configured to communicate with each other by using one differential signal line, wherein the first on-vehicle communication apparatus and the second on-vehicle communication apparatus are installed in the same vehicle, the first on-vehicle communication apparatus includes a high-band communication unit configured to generate a high-band signal including communication information and to output the high-band signal to the differential signal line, and a low-band communication unit configured to generate a direct-current signal or a low-band signal and to output the direct-current signal or the low-band signal to the differential signal line, the second on-vehicle communication apparatus includes a separation unit capable of separating a high-band signal, and a direct-current signal or a low-band signal, from a signal received via the differential signal line, a high-band communication unit configured to acquire information from the high-band signal separated by the separation unit, and a low-band communication unit configured to acquire information from the direct-current signal or the low-band signal separated by the separation unit, the differential signal line is a UTP cable, the first on-vehicle communication apparatus and the second on-vehicle communication apparatus are each a switch device, a TCU, a central gateway, a human machine interface, a camera, a sensor, an autonomous driving ECU, or a navigation device, and the separation unit includes a low-pass filter configured to attenuate the high-band signal from the signal received via the differential signal line, and a high-pass filter configured to attenuate the direct-current signal or the low-band signal from the signal.

REFERENCE SIGNS LIST 1 vehicle
10 Ethernet cable
31 switch unit (first transmission processing unit and first reception processing unit)
32 abnormality detection unit
33 port unit
35 change processing unit
36 adjustment unit (second transmission processing unit and second reception processing unit)
37 storage unit
38 processing unit (first transmission processing unit and first reception processing unit)
39 diagnosis unit (second transmission processing unit and second reception processing unit)
40 connector
41 high-band communication unit
42 low-band communication unit
43 separation unit
44 high-pass filter
45 low-pass filter
46 signal quality acquisition unit
101, 102, 103 switch device
111, 112, 113 on-vehicle communication device
301, 302, 303 on-vehicle communication system

The invention claimed is:

1. An on-vehicle communication apparatus configured to communicate with another on-vehicle communication apparatus by using one differential signal line, the on-vehicle communication apparatus comprising:

a high-band communication unit configured to generate a high-band signal including communication information and to output the high-band signal to the differential signal line; and a low-band communication unit configured to generate a direct-current signal or a low-band signal and to output the direct-current signal or the low-band signal to the differential signal line, wherein the direct-current signal or the low-band signal includes management information indicating a state regarding a physical layer between the on-vehicle communication apparatus and the other on-vehicle communication apparatus, and the communication information is information that does not include the management information.

2. An on-vehicle communication apparatus configured to communicate with another on-vehicle communication apparatus by using one differential signal line, the on-vehicle communication apparatus comprising:

a separation unit configured to separate a high-band signal including communication information, and a direct-current signal or a low-band signal, from a signal received via the differential signal line;

a high-band communication unit configured to acquire the communication information from the high-band signal separated by the separation unit;

a low-band communication unit configured to acquire information from the direct-current signal or the low-band signal separated by the separation unit; and an abnormality detection unit configured to detect an abnormality when a level of the direct-current signal acquired by the low-band communication unit is in a predetermined range or when an amplitude of the low-band signal acquired by the low-band communication unit is in a predetermined range.

3. The on-vehicle communication apparatus according to claim 1, wherein the differential signal line includes two signal lines, and the direct-current signal is transmitted via one of the two signal lines.

4. The on-vehicle communication apparatus according to claim 1, wherein the management information includes a communication quality between the on-vehicle communication apparatus and the other on-vehicle communication apparatus.

5. The on-vehicle communication apparatus according to claim 4, wherein the direct-current signal having a level corresponding to the communication quality or the low-band signal having an amplitude corresponding to the communication quality is transmitted via the differential signal line.

6. The on-vehicle communication apparatus according to claim 1 wherein the management information includes failure diagnosis information.

7. The on-vehicle communication apparatus according to claim 2, wherein the direct-current signal or the low-band signal includes management information indicating a state regarding a physical layer between the on-vehicle communication apparatus and the other on-vehicle communication apparatus, the communication information is information that does not include the management information, and the predetermined range does not overlap a range corresponding to the management information.

8. The on-vehicle communication apparatus according to claim 2, further comprising
a change processing unit configured to perform a process regarding changing of a communication path between the on-vehicle communication apparatus and the other on-vehicle communication apparatus when the abnormality detection unit has detected an abnormality.

9. The on-vehicle communication apparatus according to claim 2, wherein
the direct-current signal or the low-band signal includes management information indicating a state regarding a physical layer between the on-vehicle communication apparatus and the other on-vehicle communication apparatus,
the communication information is information that does not include the management information,
the management information includes a communication quality between the on-vehicle communication apparatus and the other on-vehicle communication apparatus, and
the on-vehicle communication apparatus further comprises
an adjustment unit configured to adjust operation of an amplifier included in the high-band communication unit in accordance with the communication quality acquired by the low-band communication unit.

10. The on-vehicle communication apparatus according to claim 1, wherein
a carrier frequency of the high-band signal is 10 mega-hertz or higher.

11. The on-vehicle communication apparatus according to claim 1, wherein
a carrier frequency of the low-band signal is less than 1 mega-hertz.

12. The on-vehicle communication apparatus according to claim 1, wherein
the communication information is an Ethernet frame according to IEEE 802.3.

13. An on-vehicle communication system comprising:
a first on-vehicle communication apparatus and a second on-vehicle communication apparatus which are configured to communicate with each other by using one differential signal line, wherein
the first on-vehicle communication apparatus includes
a high-band communication unit configured to generate a high-band signal including communication information and to output the high-band signal to the differential signal line, and
a low-band communication unit configured to generate a direct-current signal or a low-band signal and to output the direct-current signal or the low-band signal to the differential signal line,
the direct-current signal or the low-band signal includes management information indicating a state regarding a physical layer between the first on-vehicle communication apparatus and the second on-vehicle communication apparatus,
the communication information is information that does not include the management information, and
the second on-vehicle communication apparatus includes
a separation unit configured to separate a high-band signal, and a direct-current signal or a low-band signal, from a signal received via the differential signal line,
a high-band communication unit configured to acquire information from the high-band signal separated by the separation unit, and
a low-band communication unit configured to acquire information from the direct-current signal or the low-band signal separated by the separation unit.

14. The on-vehicle communication system according to claim 13, wherein
the high-band communication unit of the second on-vehicle communication apparatus generates a high-band signal including communication information and outputs the high-band signal to the differential signal line,
the low-band communication unit of the second on-vehicle communication apparatus generates a direct-current signal or a low-band signal and outputs the direct-current signal or the low-band signal to the differential signal line,
the first on-vehicle communication apparatus further includes
a separation unit configured to separate a high-band signal, and a direct-current signal or a low-band signal, from a signal received via the differential signal line,
the high-band communication unit of the first on-vehicle communication apparatus acquires information from the high-band signal separated by the separation unit,
the low-band communication unit of the first on-vehicle communication apparatus acquires information from the direct-current signal or the low-band signal separated by the separation unit,
the differential signal line includes two signal lines,
the low-band communication unit of the first on-vehicle communication apparatus outputs the direct-current signal to one of the two signal lines, and
the low-band communication unit of the second on-vehicle communication apparatus outputs the direct-current signal to another of the two signal lines.

15. The on-vehicle communication system according to claim 13, wherein
the management information includes failure diagnosis information,
the low-band communication unit of the second on-vehicle communication apparatus receives the failure diagnosis information from the first on-vehicle communication apparatus and outputs the direct-current signal or the low-band signal including predetermined information to the differential signal line, and
the first on-vehicle communication apparatus further includes
a diagnosis unit configured to diagnose a failure in the second on-vehicle communication apparatus on the basis of a reception condition of the predetermined information from the second on-vehicle communication apparatus.

16. The on-vehicle communication system according to claim 15, wherein
the communication information is periodically transmitted from the second on-vehicle communication apparatus to the first on-vehicle communication apparatus, and
when the high-band communication unit of the first on-vehicle communication apparatus is not able to receive the high-band signal including the communication information from the second on-vehicle communication apparatus for a predetermined time, the first on-vehicle communication apparatus outputs the direct-current signal or the low-band signal including the failure diagnosis information to the differential signal line.

17. The on-vehicle communication system according to claim 15, wherein
the first on-vehicle communication apparatus periodically outputs the direct-current signal or the low-band signal including the failure diagnosis information to the differential signal line, and
when the diagnosis unit is not able to receive the predetermined information from the second on-vehicle communication apparatus for a predetermined time, the diagnosis unit determines a failure in the second on-vehicle communication apparatus.

18. A communication control method to be performed in an on-vehicle communication apparatus configured to communicate with another on-vehicle communication apparatus by using one differential signal line, the communication control method comprising the steps of:
generating a high-band signal including communication information and outputting the high-band signal to the differential signal line; and
generating a direct-current signal or a low-band signal and outputting the direct-current signal or the low-band signal to the differential signal line, wherein
the direct-current signal or the low-band signal includes management information indicating a state regarding a physical layer between the on-vehicle communication apparatus and the other on-vehicle communication apparatus, and
the communication information is information that does not include the management information.

19. A communication control method to be performed in an on-vehicle communication apparatus configured to communicate with another on-vehicle communication apparatus by using one differential signal line, the communication control method comprising the steps of:
separating a high-band signal including communication information, and a direct-current signal or a low-band signal, from a signal received via the differential signal line;
acquiring the communication information from the separated high-band signal;
acquiring information from the separated direct-current signal or the separated low-band signal; and
detecting an abnormality when a level of the separated direct-current signal is in a predetermined range or when an amplitude of the separated low-band signal is in a predetermined range.

20. The on-vehicle communication apparatus according to claim 5, wherein
a plurality of the direct-current signals having different levels in accordance with the communication quality, or a plurality of the low-band signals having different amplitudes in accordance with the communication quality, are transmitted via the differential signal line.

* * * * *